June 17, 1958  A. E. GOOD ET AL  2,838,963
PROGRAMMING CONTROL MECHANISM
Filed Feb. 28, 1957  7 Sheets-Sheet 1

TURRET HEAD CONTROL

SIDE HEAD CONTROL

INVENTORS.
Albert E. Good
Theodore D. Foster
BY
Walter S. Schlegel, Jr.
Atty.

Witness:
Ralph M. Faust

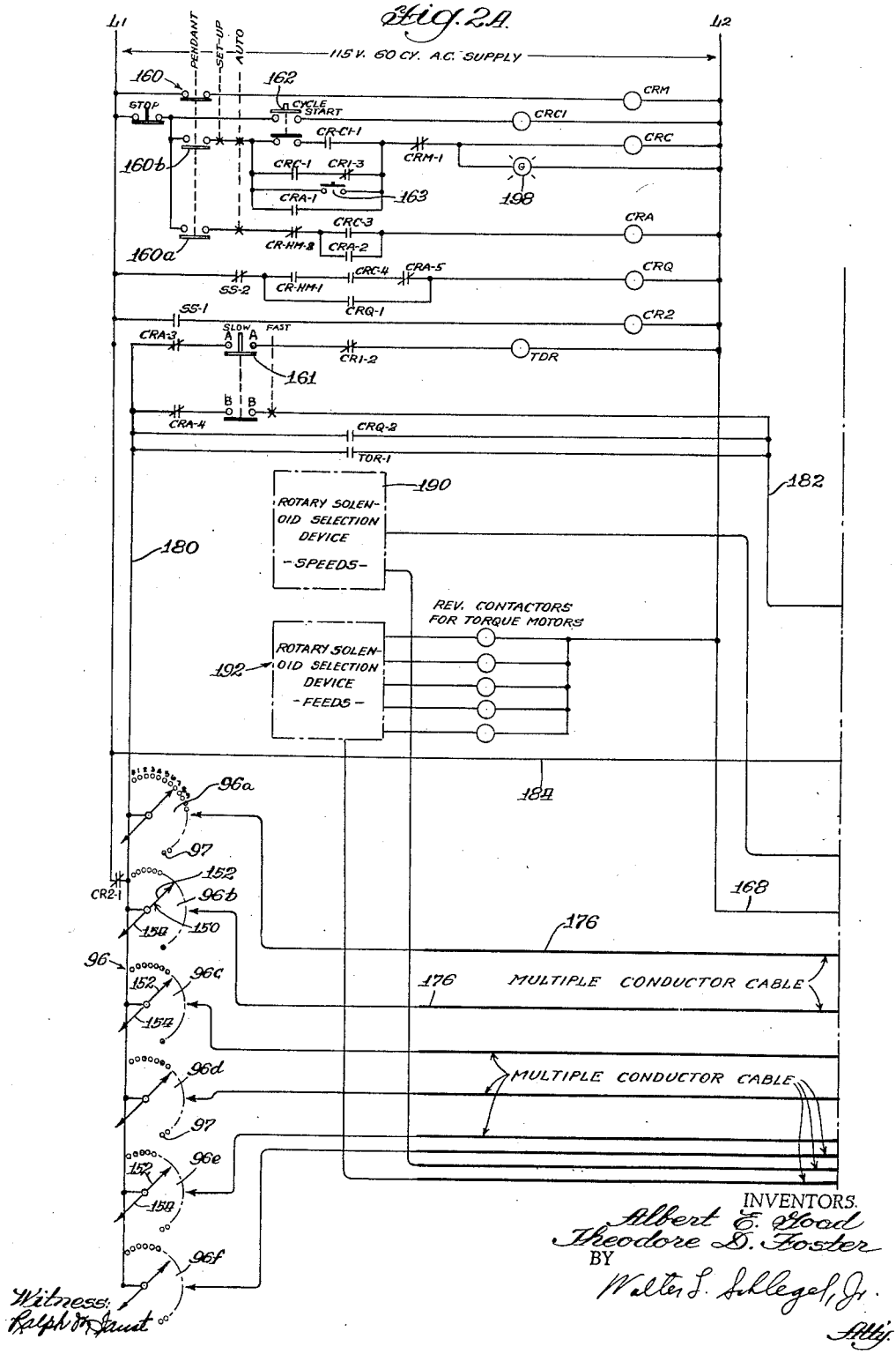

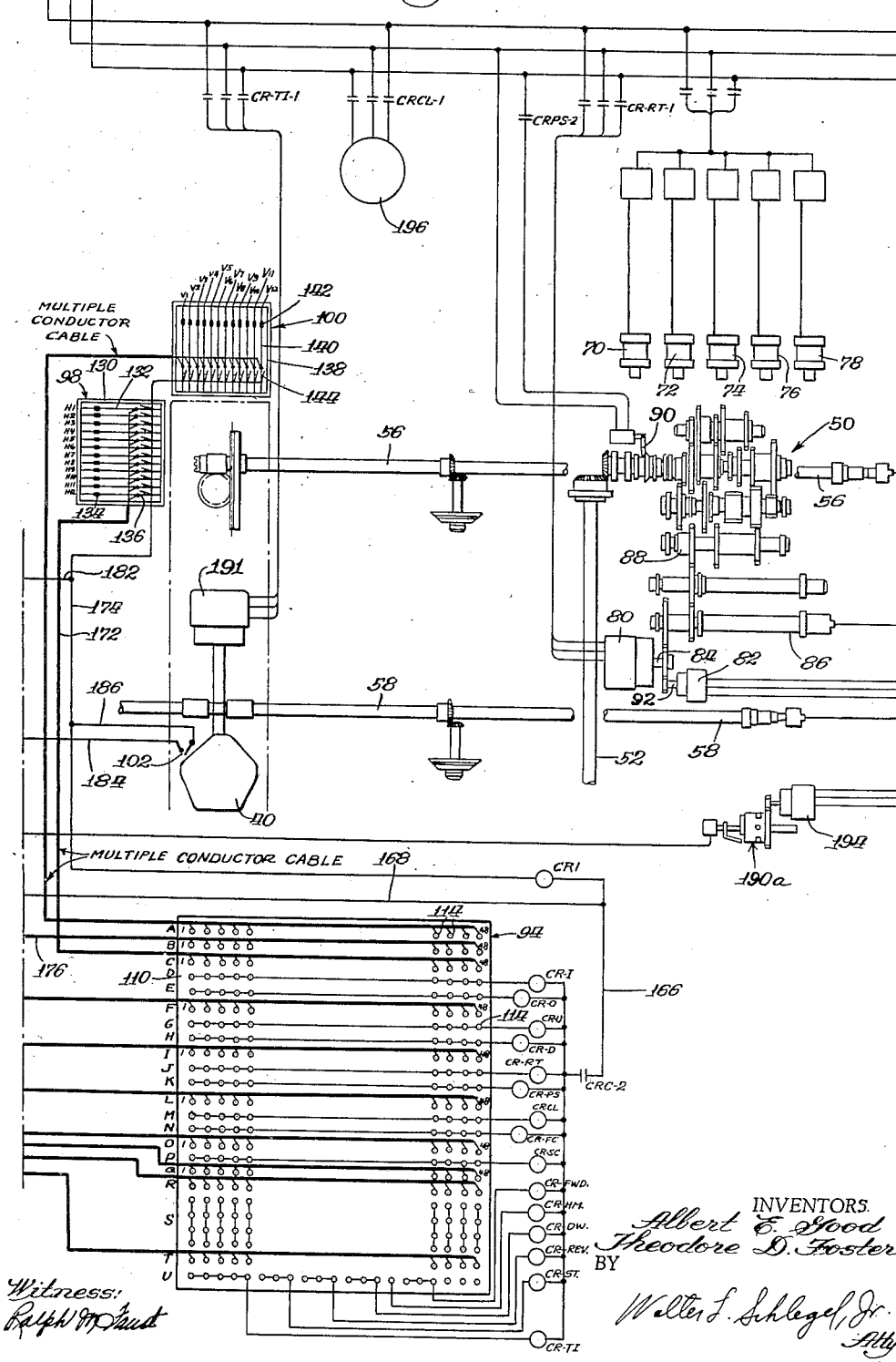

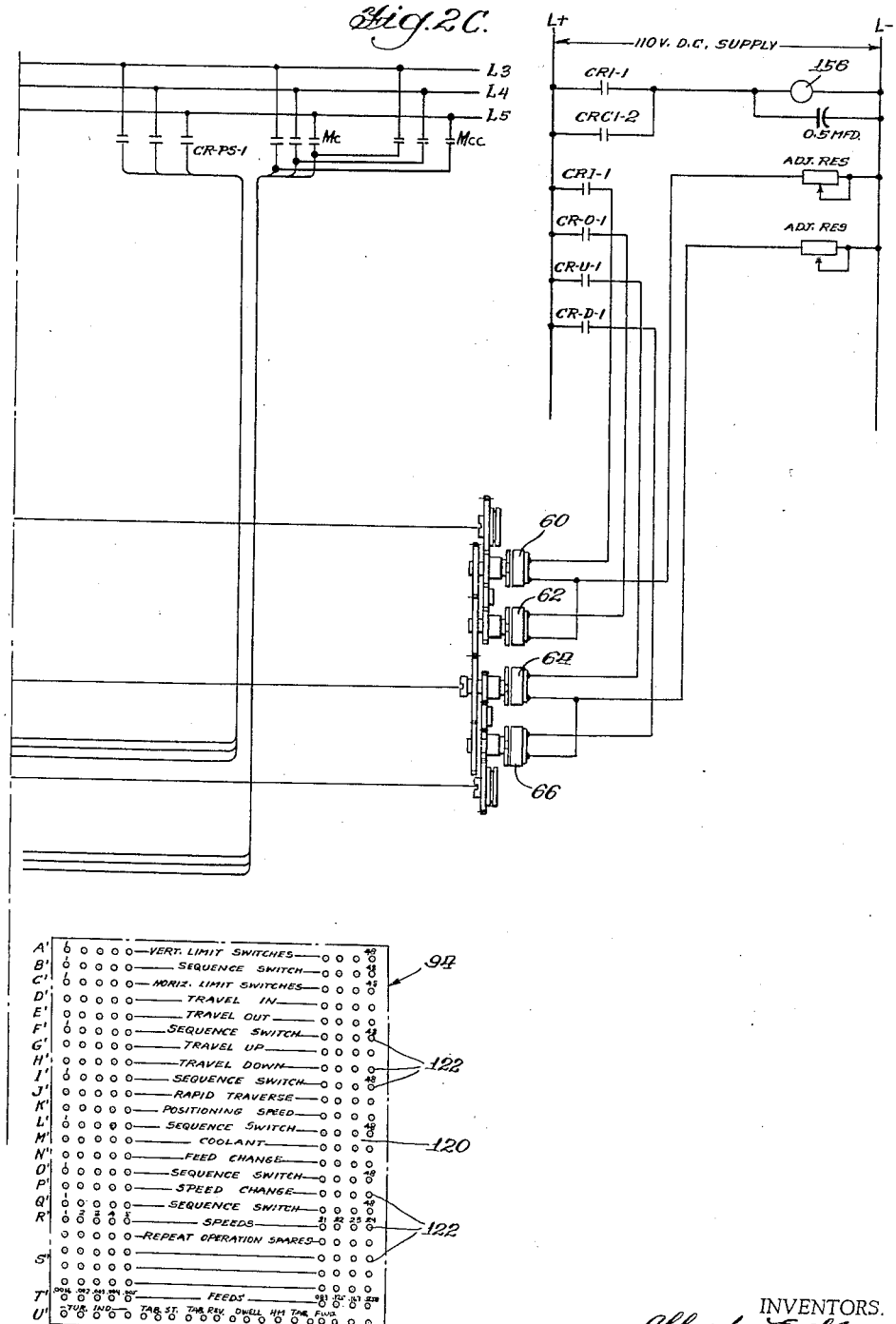

June 17, 1958 A. E. GOOD ET AL 2,838,963
PROGRAMMING CONTROL MECHANISM
Filed Feb. 28, 1957 7 Sheets-Sheet 5
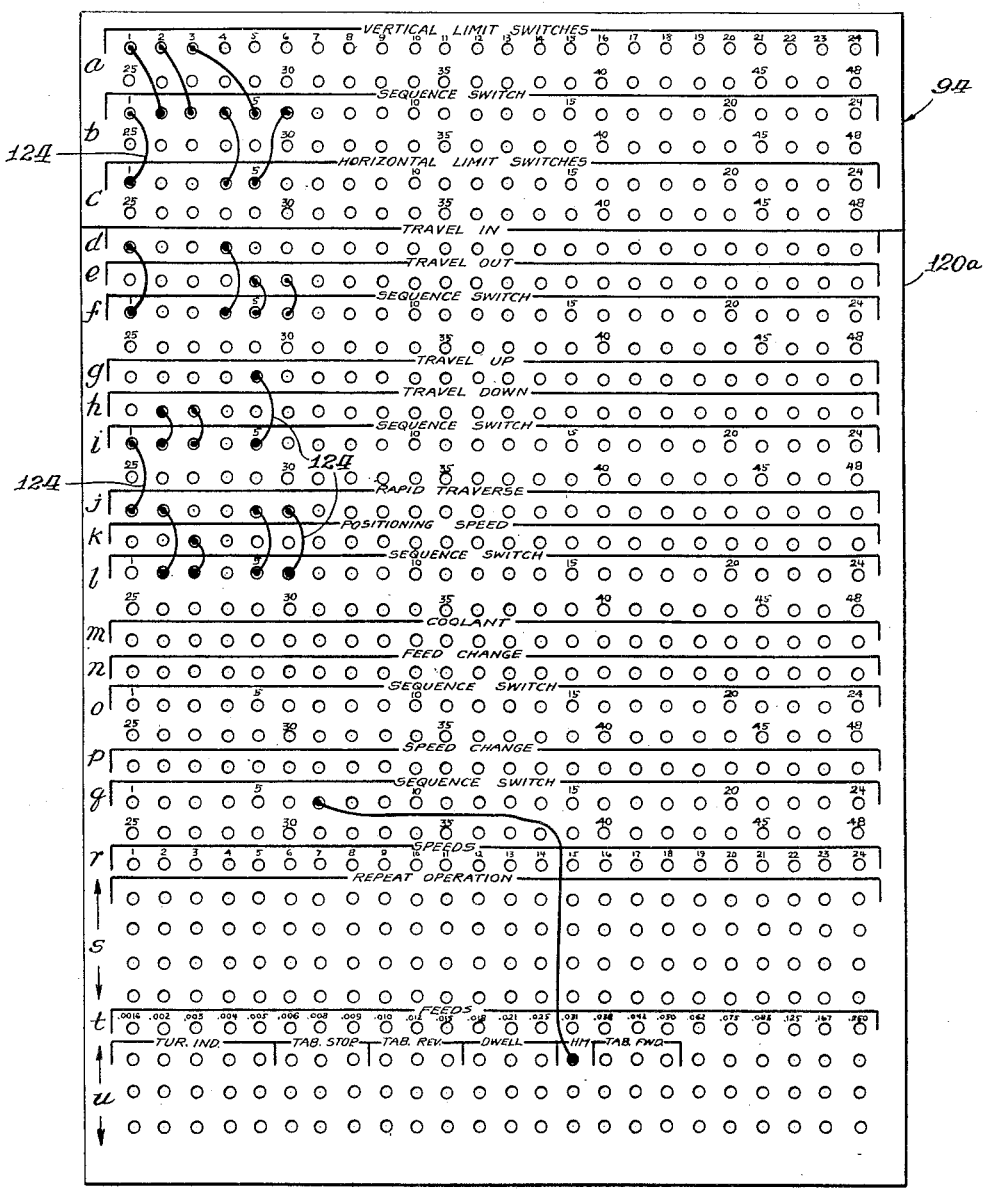
Fig. 4.
Fig. 3.
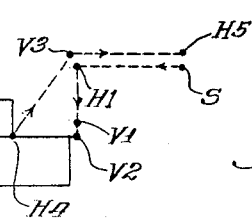
Witness:
Ralph O. Faust
INVENTORS.
Albert E. Good
Theodore D. Foster
BY
Walter J. Schlegel Jr.
Atty.

June 17, 1958

A. E. GOOD ET AL 2,838,963

PROGRAMMING CONTROL MECHANISM

Filed Feb. 28, 1957

Witness:
Ralph M. Faust

INVENTORS.
Albert E. Good
Theodore D. Foster
BY
Walter J. Schlegel, Jr.
Atty.

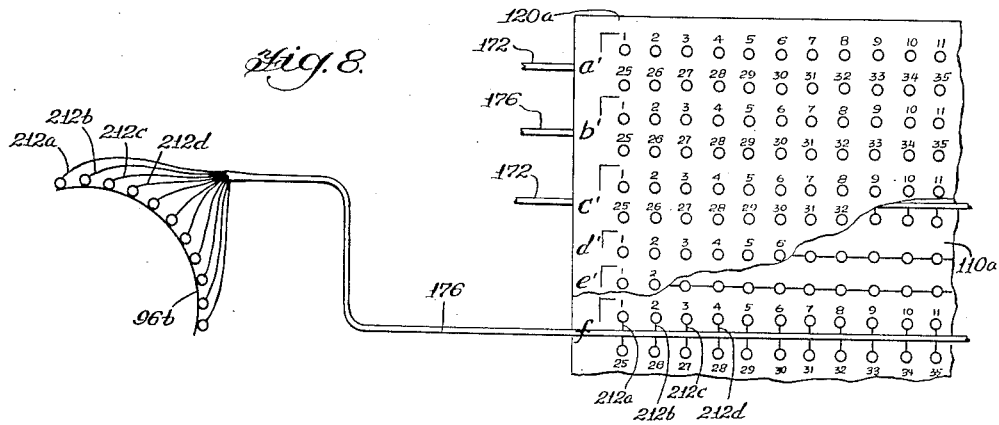
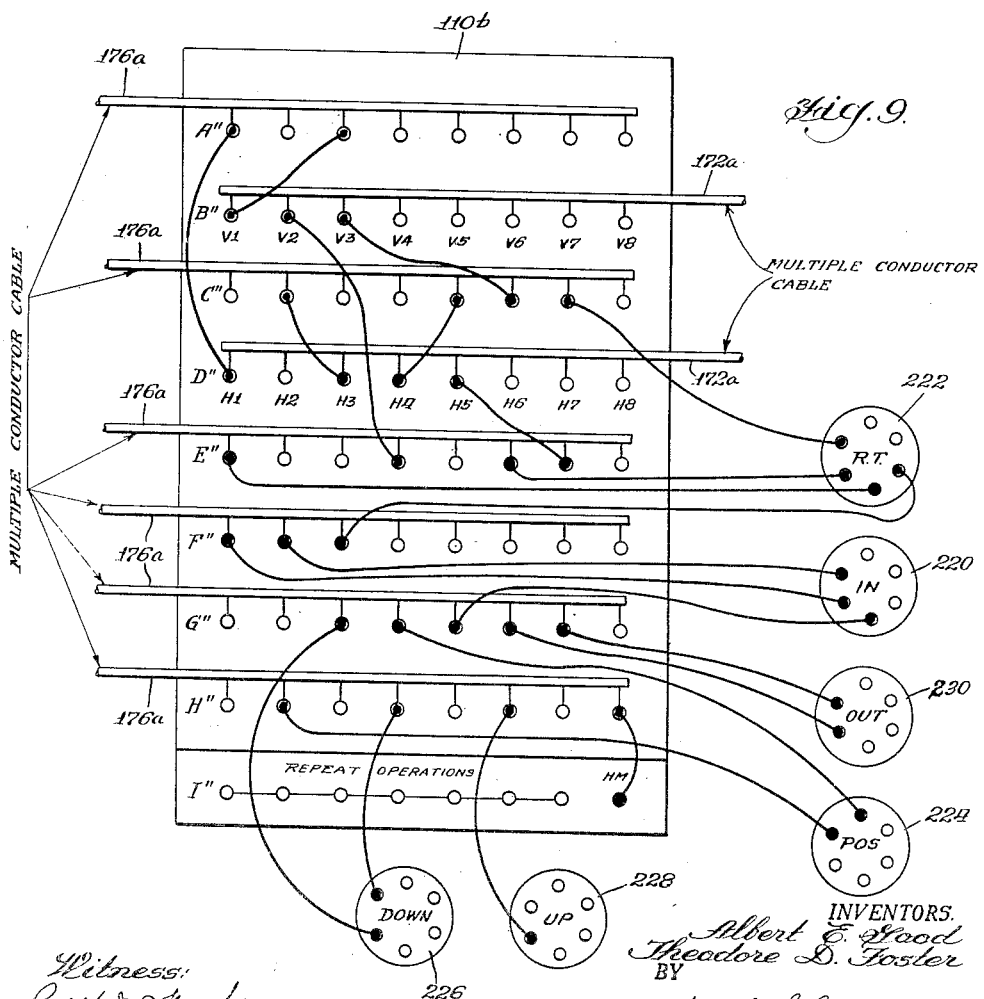

United States Patent Office 2,838,963
Patented June 17, 1958

---

2,838,963

PROGRAMMING CONTROL MECHANISM

Albert E. Good, Madeira, and Theodore D. Foster, Montgomery, Ohio, assignors to American Steel Foundries, Chicago, Ill., a corporation of New Jersey Application February 28, 1957, Serial No. 643,040

11 Claims. (Cl. 77—4)

This invention relates to controls for a mechanism such as a machine tool capable of producing a plurality of functions and more particularly to a control mechanism for automatically selecting in any sequence one or more of the functions which the mechanism is capable of performing and including means for determining the extent or duration of each of the functions.

A primary object of the invention is to devise a control wherein a stationary panel is permanently wired to a stepping switch, to function determining and initiating switches, and to the actuating means for effecting various functions of the controlled mechanism, and wherein a pre-wired, readily removable switchboard or panel may be quickly assembled with the permanent panel to interconnect various electrical terminals thereof, so that automatic actuation of the stepping switch and consequent automatic cycling of the mechanism is governed by the manner in which the removable panel is pre-wired.

Another object of the present invention is the provision of a control mechanism for an apparatus adapted to perform a predeterminable cycle of operation wherein the cycle comprises a plurality of sequential and/or overlapping functions.

Another object is the provision of a control mechanism for a machine tool capable of performing a plurality of functions wherein the control mechanism is adapted to be set for fully automatic operation of said machine tool through a complete cycle of operation, or to be set for semi-automatic or set-up operation of said machine tool accommodating jogging steps through the cycle of operation or any portion thereof, or to be set for pendant station operation of said machine tool.

Another object is the provision of a control mechanism including means adapted to be preset for causing a mechanism to perform a plurality of functions in any desired sequence or in certain combination, said means being adapted to be reset in a minimum of time to add functions or insert functions.

Still another object is the provision of a control for automatically governing a predeterminable cycle of operation wherein any function of the cycle of operation may be repeated during any portion of the cycle.

Another object is the provision of a control system for a machine tool having a rotatable work support and an indexable tool carrying member movable in a plurality of directions along a plurality of paths at a plurality of speeds, said system including presettable means for determining the sequence of action in a cycle of operation of any of the functions of which the machine tool is capable of performing, and including means for sequentially causing the energization of said presettable means whereby circuits are completed to cause the functions to occur, and also including means for determining the completion of each function and causing, through the presettable means, the actuation of the energizing means, and wherein the presettable means includes a correlating portion whereby any of the means for determining the completion of each function may be utilized at random for any desired step in the cycle of operation.

Other objects of the invention include the provision of a control system for a machine tool having a rotatable work support and a plurality of tool carrying members each movable in a plurality of directions along a plurality of paths at a plurality of speeds, each tool carrying member being provided with its own control mechanism; the provision of such a control system in which the activity of each control mechanism is adapted to be initiated by the activity of the other; the provision of such a control system adapted to initiate independent or simultaneous operation of the tool carrying members in any sequence; the provision of such a control system wherein each separate control mechanism may initiate its own activity or the activity of any other control mechanism during any portion of the cycle of operation; the provision of such a control system wherein any of the individual control mechanisms may, in response to the completion of any function, initiate the activity of itself or any of the other individual control mechanisms to cause any other function to be performed of which the machine is capable or to cause the same function to be repeated.

Other objects and advantages will become apparent from the following specification and accompanying drawings, in which:

Figure 1 is a general front elevational view of a boring mill incorporating the subject matter of the invention;

Figures 2A, 2B, and 2C are a diagrammatic illustration of the preferred embodiment of the invention as applied to a vertical boring mill, with the removable switchboard detached from the stationary panel;

Figure 3 is a diagrammatic illustration of a workpiece and the cycle of operation by which the workpiece may be formed;

Figure 4 is a view of a modified switchboard as set up to control the cycle shown in Figure 3;

Figure 8 is a fragmentary enlarged view of the modified switchboard and the multiple cable connection of one level thereof to one bank of the stepping switch, and Figure 9 illustrates another modified embodiment of a switchboard which might be utilized to control the cycle shown in Figure 3.

Figure 1:
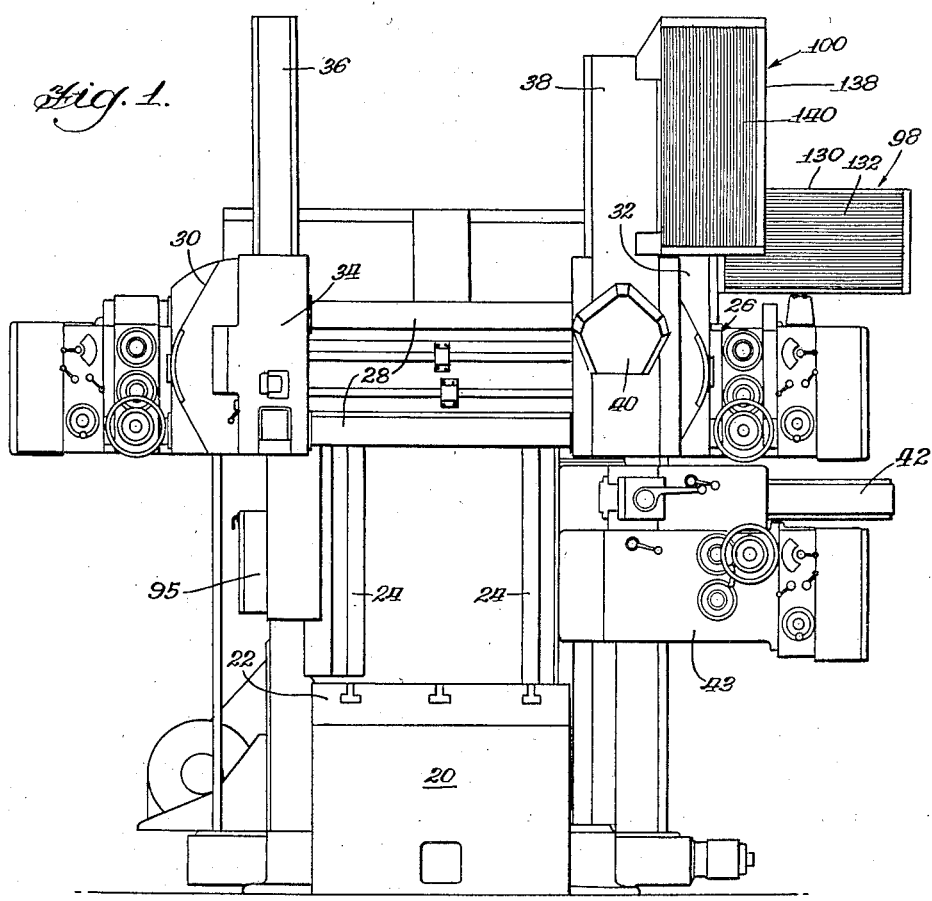

Describing the invention in detail as applied to a vertical boring mill, and referring first to Figure 1, it is seen that the boring mill comprises a base 20 which carries a rotatable table 22, upon which a workpiece may be chucked in the usual manner. The base is also provided with vertical guide ways 24 which mount a vertically movable rail indicated generally at 26. The rail is in turn provided with horizontal guide ways 28 which slidably carry horizontally movable rail heads 30 and 32.

The rail head 30 carries a conventional swivel 34 adapted to swivel on a substantially horizontal axis and to receive a ram 36 which is movable in a generally vertical direction depending on the position of the swivel 34 as is well known to those familiar with this art. The rail head 32 is provided with a turret slide 38 carrying a turret 40 indexable on a substantially horizontal axis. Though a five position turret is illustrated in Figure 1, it will be understood that in certain instances a square turret may be preferred. A side head ram 42 is movable horizontally in a side head 43 which in turn is movable vertically in a conventional manner on ways provided on the mill. It will be understood that, depending on the machining requirements of a particular customer, the boring mill may be equipped with a ram, turret, and side head, or any combination thereof.

A transmission (not shown) is provided for rotating the table 22 at a plurality of selectable speeds. The transmission comprises a plurality of shafts having gear means adapted to be interconnected in various combinations to form thereby gear trains, each adapted to produce a particular table speed. The transmission also comprises a plurality of clutches for selectively interconnecting said gear means, and comprises further preadjustable clutch actuating means for selectively actuating the proper clutches to interconnect the desired gears. A preselection means in the form of a rotary solenoid selection device is provided whereby the above mentioned clutch actuating means may be preadjusted to a desired preselected table speed so that when this speed is required at a subsequent time, the shifting of the gears and clutches to a new gear train can be rapidly accomplished. For an understanding of the transmission unit and the preselective speed changing unit employed in this particular boring mill, attention is directed to copending application Serial No. 589,537, filed June 5, 1956, in the name of Theodore Foster, the disclosure of which is incorporated herein by reference.

The turret 40 may be power indexed at any desired time, in order to change to a different tool, in the manner illustrated in copending application Serial No. 575,-381, filed April 2, 1956, in the name of Theodore Foster, the disclosure of which is incorporated herein by reference.

A feed box transmission controls the movement of the turret head and similar feed box transmissions are utilized to control the movement of the ram 36 and side head ram 42. The various feed boxes are basically similar in operation and form no part of the present invention. For this reason only the transmission for the turret head is illustrated herein. The feed box transmission for the turret is shown schematically in Figure 2B and is indicated generally by the numeral 50. Power for the feed box transmission 50 is supplied by the above described table transmission through the feed shaft 52 which rotates at a speed which is preferably at a ratio of 1 to 1 with the rotational rate of table 22.

Vertical movement is imparted to the turret slide 38 by means of a vertical feed rod 56 (Figure 2B), while horizontal movement is imparted to the turret head 32 by means of a cross feed screw 58. The horizontal and vertical motions may, of course, be in either direction depending upon the direction of rotation of the vertical feed rod or the cross feed screw, or angular movement of the turret may be accomplished by combined rotation of the vertical feed rod and cross feed screw.

Selective motion of the vertical feed rod and cross feed screw is obtained by means of a plurality of magnetic clutches designated 60, 62, 64 and 66 which selectively connect the rod and screw to the feed shaft 52 through the intermediary feed box transmission 50.

The feed box transmission 50 comprises a plurality of shafts having thereon a plurality of gears, certain of which are shiftable, whereby various gear trains may be set up. By means of the gear shifting, it is possible to obtain, for example, 24 separate tool feeds for any given rate of table rotation. For a better understanding of a typical feed box transmission and of the electro-magnetic clutch system utilized in a boring mill of this type, attention is directed to copending application Serial No. 492,-382, filed March 7, 1955, in the name of Theodore Foster et al., the disclosure of which is incorporated herein by reference.

The feed box transmission 50 of the present disclosure, while generally the same as the feed box transmission of application Serial No. 492,382, differs in the manner in which the gear shifting is accomplished. The gears which must be shifted are mounted on splined shafts and are moved to their various positions by lineally movable shifter means (not shown). The shifter means are in turn moved by a rack and pinion system (not shown) in which each pinion is moved by a reversing torque motor. In order to obtain 24 separate feed rates, it is necessary to have five shifting gears and each of these gears is shifted by means of its own torque motor. These motors are illustrated in Figure 2B at 70, 72, 74, 76 and 78.

The feed box transmission 50 is also provided with a rapid traverse motor 80 and a positioning motor 82. The rapid traverse motor is for the purpose of rapidly moving the tool toward or away from the workpiece at a high rate of speed in order to reduce production time to a practical minimum. In operation, the motor 80 drives a shaft 84 at a high rate of speed and this motion is transmitted to a shaft 86 and thence through the magnetic clutches to the rod 56 and/or the screw 58 depending on which magnetic clutch or clutches are energized at that time. The rapid motion is prevented from being carried through the entire transmission to the shaft 52 by the utilization of a conventional overrunning clutch 88.

The positioning motor 82 serves the purpose of accurately moving the tool into exact cutting postion. Necessarily, this positioning speed is slow compared to usual feed rates, as, for example, a tool movement of one-half inch per minute. Because of this slow speed when the positioning motor 82 is operated, the transmission must be disconnected from the drive shaft 52 whenever a speed and feed combination will give a motion to the ram or saddle which is over one-half inch per minute, and this is accomplished, for example, by disengaging a conventional solenoid operated clutch indicated schematically at 90. The overrunning clutch 92 is provided so that the positioning motor will run without driving back through the transmission.

Control mechanism

Referring now to the specific subject matter of the invention, the programming control mechanism comprises basically three major elements which are: (1) means for predetermining the sequential functions of one or more moving members of the boring mill; (2) means for sequentially energizing the function determining means whereby electrical control circuits are completed to cause the functions to occur; and (3) means for determining the completion of a function and for causing, through the function determining means, the actuation of the energizing means. These various elements will subsequently be described in detail, but briefly, the function determining means comprises a patchcord board or switchboard unit indicated generally at 94 (disassembled) in Figures 2B and C. The energizing means comprises a multi-bank stepping or sequence switch indicated generally at 96; and the means for determining the completion of a function and causing, through the patchcord board, the actuation of the energizing means comprises generally, as shown in Figures 1 and 2B, a horizontal stop rod or grid assembly 98 and a vertical stop rod or grid assembly 100. Various other function control elements, such as a turret indexing switch 102 (Figure 2B) may be utilized, and these will be described in conjunction with the operational description of the novel control as it is utilized for programming the operation of a vertical boring mill.

Patchcord or switchboard unit

The switchboard unit shown schematically in Figures 2B and 2C and designated 94 comprises a fixed panel 110 having a plurality of levels A to U which may be vertically spaced, as in the illustration of Figure 2B. It will be understood that these "levels" may be spaced from each other or arranged in any desired plane. Each of the levels is provided with a plurality of permanently wired contact receptacles 114. The receptacles of levels A and C are insulated from each other and are independently wired by multiple conductor cables to various grid switches as will be hereinafter described in detail. The receptacles 114 of levels B, F, I, L, O and Q are insulated from each other and are independently wired, respectively, to insulated steps of stepping switch banks 96a to 96f, as by multiple conductor cables shown in Figures 2A and 2B, said banks 96a to 96f preferably being spaced insulated components of a conventional stepping switch which has six wipers 150 movable in unison so that the wipers simultaneously engage the #1 contacts of their related banks to thereby simultaneously energize the #1 receptacles of the levels B, F, I, L, O and Q. When the wipers 152 simultaneously move to the #2 contacts of their related banks 96a to 96f, respectively, the #2 receptacles of the related levels of board 110 are energized, etc.

The receptacles 114 of each level D, E, G, H, J, K, M, N, and P are preferably electrically connected to each other and are electrically connected to related function control relays, as hereinafter described in detail.

The receptacles of levels R and T of board 110 are insulated from each other and are independently connected as by multiple conductor cables to separate contacts of a table speed selector 190 and tool feed selector 192 as hereinafter described in detail.

The receptacles of level S are electrically connected in a plurality of vertical series, so that four #1 receptacles are in the first series, four #2 receptacles are in the second series, etc. The purpose of this arrangement is to conveniently accommodate repeated use of any desired grid switch, or to repeat functions as will be hereinafter described in detail. In the particular embodiment shown in Figure 2B the first and third, namely, levels A and C of the three upper levels of panel 110, for example, are wired to the respective grid assemblies while the intermediate level B of the three is wired to one bank 96a of the stepping switch 96, each receptacle of the level B, as above described, being wired to a separate contact of the bank. These three levels thereby form a sequence or correlating portion, the reasons and advantages for which will be explained hereinafter. Generally speaking the correlating portion is so called because it correlates the individual steps of the sequence or stepping switch and the grid switches thereby permitting random use of the grid switches in any particular cycle of operation.

The lowermost level U of the panel 110 has a plurality of receptacles wired to a turret indexing control relay CR–TI; a plurality of receptacles wired to a table-stop control relay CR–ST; a plurality of receptacles wired to a table-reversing control relay CR–Rev; a plurality of receptacles wired to a tool dwell control relay CR–Dw to permit tool dwell for one revolution of the table at the end of a cut; a plurality of receptacles wired to a table-forward control relay CR–Fwd to start the table after it has been stopped; and one receptacle wired to a cycle-homing control relay CR–Hm, which when energized terminates a cycle of operation and steps the switch 96 to a home position preparatory to initiation of a new cycle.

It is to be emphasized that the receptacles of each level which is connected to a sequence switch bank are insulated from each other and are connected, respectively, to separate contacts or steps of the related sequence switch bank. Also separate levels are provided for switches actuated by the horizontal grid assembly and by the vertical grid assembly, and the receptacles of each level connected to a grid assembly are insulated from each other and are connected, respectively, to separate switches of the related grid assembly. As will be more fully explained, the latter feature permits separate use of any of the horizontal or vertical grid switches. In other words, use of a particular horizontal grid switch does not preclude the use of the corresponding vertical grid switch. In Figures 2A and 2B the various lines connecting the panel 110 to the grid assemblies, to the speed and feed changers, 190 and 192, respectively, and to the sequence switch banks, for example, lines 172, 174 and 176 are multiple conductor cables.

The switchboard unit 94 also comprises a removable panel or switchboard 120 provided with a plurality of horizontally and vertically aligned openings 122 arranged in levels A' to U' corresponding to levels A to U of stationary panel 110. The removable board 120 is adapted to be superimposed on the fixed board and to be detachably held in assembly therewith, at which time jumpers 124 (Figures 4 and 6) having elongated contact tips at each end thereof previously inserted through the proper openings in the board 120 are received within and make electrical contact with the corresponding receptacles of the panel 110 to thereby preselect or predetermine the desired functions to be performed on the boring mill as will be explained hereinafter. The assembled panels, 110 and 120 therefore, comprise a sequence portion and a plurality of function levels. Each of the levels have receptacles constituting sequential individual stations, adapted to be interconnected to cause, upon energization, machine functions to occur in a manner to be described in conjunction with the operational description. (It should be noted that the connections made in this manner are inoperative until energized by the sequential stepping of the sequence switch.)

The functions referred to above are any functions which the boring mill is capable of performing and may be divided into the following categories:

(1) Tool directional functions.
  A. Horizontal travel of tool member either in or out.
  B. Vertical travel of tool member up or down.
  C. Angular movement of tool member caused by combined horizontal and vertical movement thereof.
(2) Tool rate functions.
  A. Rapid traverse either horizontally, vertically, or angularly.
  B. Positioning either horizontally or vertically.
  C. Selected feed either horizontally and vertically.
(3) Miscellaneous.
  A. Table speed.
  B. Turret indexing.
  C. Coolant.
  D. Table stop.
  E. Table reverse.
  F. Tool dwell.
  G. Table forward.

*Stop block or grid assembly*

The horizontal grid assembly 98 as seen in Figures 1 and 2B comprises a frame 130 mounted on the saddle 32 for movement therewith in a horizontal direction. A plurality of rods 132 are provided in the frame, each rod having movably mounted thereon a dog 134 (Figure 2B). The dogs 134 may be moved along the rods to any desired position and locked in position by any conventional locking means. Each of the dogs 134 is engageable with a corresponding switch 136. One switch is provided for each dog, and all of the switches 136 are mounted on the rail 28.

The vertical grid assembly 100 comprises a frame 138 mounted on the ram 33 for vertical movement therewith and is provided with a plurality of rods 140 each carrying an adjustable dog 142 (Figure 2B) which is engageable with a corresponding switch 144. One switch 144 is provided for each dog 142 and all switches 144 are mounted on the saddle 32.

Each of the switches 136 and 144 is positioned to be closed by the particular dog with which it is aligned and is adapted to be closed by contact with the related grid dog moving in either direction. The length of each of the grid assemblies 98 and 100 is slightly greater than the maximum travel of the member to which it is attached. Twelve horizontal and twelve vertical dogs and switches are illustrated in Figure 2B in the interest of simplicity and are designated H1 through H12 and V1 through V12 respectively, but in practice a larger number of dogs and switches are contemplated as in the instant device 48 vertical and 48 horizontal switches.

Sequence switch

The stepping or sequence switch 96 utilized in the disclosed embodiment of the invention comprises six banks of contact steps designated in Figure 2A as banks 96a through 96f. Each of the banks has 48 available contacts 97 (0 to 9 being separately numbered in bank 96a), each contact representing a single step in any cycle of operation of the boring mill.

The contacts of each bank of the switch are mounted in a double arc, though for simplicity only one arc is shown. The switch wipers 150 rotate in only one direction and are made in two offset sections 152 and 154 so that as one section leaves one arc, the other section enters the other arc. In operation, an armature (not shown) having a coil 156 (Figure 2C) acts, upon energization of the coil, to cock the switch. Upon de-energization of the coil 156, a spring driven pawl (not shown) steps the wipers to the next adjacent contacts. Complete details of the switch are not illustrated because it is a conventional switch, such as manufactured by the Automatic Electric Company, Chicago, Illinois, and is designated a type 45 stepping switch. It is obvious that stepping or sequence switches having other numbers of contacts or banks could be utilized, but the disclosed switch is preferred for the instant disclosure. Other modifications might also be made in the sequence switch. For example, for convenience the switch wipers of the preferred embodiment all engage their number one contact at the same time and simultaneously move to their number two contact, etc. However, this is not absolutely necessary, provided that each switch wiper energizes the related contact or station of the fixed panel 110 when the level in which that station is located is required by the desired cycle to energize a function relay.

As described earlier, the grid assemblies 98 and 100 and also the first bank or sequence level 96a of the sequence switch are permanently wired to separate levels of the patchcord board 110. It is obvious, therefore, that the various contacts of the sequence switch bank 96a can be interconnected to the various horizontal and vertical grid switches. It should be particularly noted that connections between the sequence switch contacts and the grid switches are only through the patchcord unit 94 and further that any contact of the sequence switch bank 96a can be connected through the patchcord unit to any of the horizontal or vertical grid switches. It should also be noted that all of the grid switches, either horizontal or vertical, are completely isolated from each other.

The remaining banks or levels of the sequence switch, namely, those designated 96b through 96f are function levels and are utilized to initiate successive predetermined functions of the boring mill as determined by the switchboard unit 94 as the sequence switch is moved through sequential steps.

No low voltage circuit is required through the sequence switch contacts. All of the control circuits may operate on 110 volts A. C. which gives greater reliability in contact closure and also provides a lower current rate through the contacts to operate a particular device. There is no current flowing through the contacts of the sequence switch during a stepping operation. Current to the switch is shut off before the wiper of the switch moves whereby arcing is prevented and the life of the switch is extended.

The manner in which the banks of the sequence switch are wired to the corresponding sequence levels of the patchcord unit is illustrated in Figure 8 which shows a fragmentary portion of bank 96b wired to level f of a modified board 110a. A multiple conductor cable 176 carries a plurality of individual wires 212a, 212b, 212c, 212d, etc. Each wire is connected to a separate contact 97 of the sequence switch and is also connected to a separate contact or station 114 of level f of board 110a. It should be noted that, whereas all of the stations of each sequence level of board 110 (Figure 2B) are disposed in a single row, the stations of each sequence level of the modified board 110a (Figures 4, 6 and 8), for example, level f in Figure 8, are disposed in two rows. The choice of boards is a matter of design convenience but the fact that either may be used illustrates the versatility of the present invention.

Operational description

Various elements other than those described above can be best disclosed in conjunction with a description of a simple cycle of operation. For illustrative purposes, it may be assumed that it is desired to form the circular workpiece shown in elevation in Figure 3. The dotted line in the figure represents the path of tool member travel and the grid switches which terminate each function are schematically indicated at the approximate point of termination of each function. The program may be set up as indicated in the following schedule, wherein the sequential operational step numbers are indicated together with the particular function which occurs at each step and also the grid switches which will be utilized to terminate each sequential function.

| Sequence Switch Contacts | Program Step and Function | Function Terminating Grid Switch |
|---|---|---|
| 1 | 1—Rapid Traverse In | Horiz. #1. |
| 2 | 2—Rapid Traverse Down | Vert. #1. |
| 3 | 3—Position Down | Vert. #2. |
| 4 | 4—Travel In (Preset Feed Rate) | Horiz. #1. |
| 5 | 5—Rapid Traverse at 45° (Out, Up and Rapid Traverse) | Vert. #3. |
| 6 | 6—Rapid Traverse Out | Horiz. #5. |
| 7 | 7—Step Switch Home | |

The modified removable switchboard 120a (Figure 4) for the above operational cycle is set up in the following manner and, for convenience, the horizontally disposed portions or levels have been indicated by letters and each of the openings or stations representing connections to the grid switches and to the individual steps of the sequence switch have been numbered from 1 through 48. It should again be noted that in the modified switchboard, the openings or stations for the 48 available steps of the sequence stepping switch are disposed in two horizontal rows. For example, the stations for step 1 and step 25 of each sequence switch bank are both in the first vertically aligned group. Similarly, the openings or stations for the connections to the grid switches are disposed in two horizontal rows. Each of the above double rows of stations form a single level or portion and has been given a single letter so that the two rows of vertical limit switch stations form the vertical limit switch level and are lettered a, the two rows of horizontal limit switch stations form the horizontal limit switch level and are lettered c and the double rows of sequence switch stations form the various sequence switch levels and are lettered b, f, i, l, o, and q. The corresponding levels of the permanent panel 110 are similarly modified.

Referring again to the switchboard set-up of the operational cycle, a jumper or connecting wire 124 is connected between function level j, representing Rapid Traverse, and the #1 station of any of the stepping switch levels, in this case level i.

It should be noted that the connection could have been made to any of the openings in the function level j, inasmuch as all openings thereof are interconnected as seen in Figure 2B. Also the connection could have been made from level j to the #1 station of any of the sequence switch levels because corresponding contacts on all banks of the sequence switch are energized simultaneously. Another jumper 124 is plugged in to connect level $d$, representing travel In, to sequence switch station #1 in level $f$. At the sequence portion of the switchboard 120a, a third jumper 124 is plugged in to connect sequence switch station #1 in level $b$ to the horizontal limit switch station #1 in level $c$.

For the second step of the operational cycle, station #2 in sequence level $l$ is connected to function level $j$, representing Rapid Traverse; station #2 in sequence level $i$ is connected to function level $h$, representing travel Down; and station #2 in sequence level $b$ is connected to vertical limit switch station #1 in level $a$.

For the third step of the operational cycle, the station #3 in sequence level $l$ is connected to function level $k$, representing positioning speed; station #3 in sequence level $i$ is connected to function level $h$, representing travel Down; and station #3 in sequence level $b$ is connected to vertical limit switch station #2 in level $a$.

For the fourth step of the operational cycle, station #4 in sequence level $f$ is connected to function level $d$, representing travel In; and station #4 in sequence level $b$ is connected to the horizontal limit switch station #4 in level $c$. The latter connection could have been made to horizontal limit switch station #2, but the above described connection illustrates that any of the limit switches can be utilized to terminate the function at any sequential step of the cycle. The feed rate as above noted will be as preset in the machine unless changed in a manner to be described in a subsequent cycle of operation.

For the fifth step of the operational cycle, station #5 in sequence level $i$ is connected to function level $g$, representing travel Up; station #5 in sequence level $f$ is connected to function level $e$, representing travel Out; station #5 in sequence level $l$ is connected to function level $j$, representing Rapid Traverse; and station #5 in sequence level $b$ is connected to vertical limit switch station #3 in level $a$.

For the sixth step of the operational cycle, station #6 in sequence level $l$ is connected to function level $j$, representing Rapid Traverse; station #6 in sequence level $f$ is connected to function level $e$, representing travel Out; and station #6 in sequence level $b$ is connected to horizontal limit switch station #5 in level $c$.

For the seventh step, station #7 in sequence level $q$ is connected to the home switch station in portion $u$.

Because the switchboard 120a is removable, the set-up as outlined above is done easily and quickly prior to assembly of the switchboard 94 with the fixed panel 110a. After the removable switchboard is assembled with the fixed panel, the machine operator is ready to start the machine to perform the desired preselected sequential functions.

To start the operation, the operator first may set the three-position selector switch 160 (Figure 2A) to the set-up position whereat contacts 160b are closed. With the switch in this position, the machine may be moved in single steps so that the operator may accurately position each of the grid dogs to determine the distance or duration of the function at each individual step of the cycle and also to measure the workpiece at each step if he so desires.

With the switch 160 in set-up position, the operator momentarily depresses a cycle start button 162 thereby completing a circuit through control relay CRC1 to close normally open contacts CRC1–1 (Figure 2A) and CRC1–2 (Figure 2C). Closing contacts CRC1–1 energizes relay CRC which locks in through its normally open contacts CRC–1 and closes normally open contacts CRC–2 (Figure 2B). Closing contacts CRC1–2 completes a circuit through the coil 156 of the sequence switch armature causing the armature to shift and mechanically close sequence switch interrupter contacts SS–1 (Figure 2A). Releasing button 162 breaks the circuit through relay CR–C1 thereby causing contacts CR–C1–2 to open and coil 156 to be de-energized. A sequence switch spring (not shown), which was cocked by the action of the armature, immediately steps the switch wipers 152 on all of the switch banks from the home position to the first contacts thereby energizing the group of number 1 stations in the various levels of the patchboard unit 94 to initiate the first step of the cycle.

A circuit is now completed through the stepping switch and the switchboard in a manner to be described in detail in the description of the automatic cycling of the machine, whereby the tool carrying member moves in the first of its preselected functions. At the completion of the first function a grid switch H1 is closed as will be described hereinafter.

Closing the grid switch H1 completes a circuit through the first contact of the first bank 96a of the stepping switch, through the jumper connecting station #1 of level $b$ to station #1 of level $c$ of the switchboard, through the closed grid switch H1 and through the coil of relay CR1 to line 2. Completing this circuit energizes the coil of relay CR1 thereby closing normally open contacts CR1–1 and simultaneously opening the normally closed contacts CR1–3. Closing the contacts CR1–1 energizes sequence switch coil 156 to shift the armature as described heretofore and close contacts SS–1. Closing contacts SS–1 energizes the coil of relay CR2 causing normally closed contacts CR2–1 to open and break the circuit through relay CR1. Opening contacts CR1 de-energizes coil 156 whereupon the switch will step to the second row of contacts as described heretofore and, as a consequence, the relays which caused the first step of the cycle are de-energized and the first step is immediately terminated. Opening the contacts CR1–3 breaks the holding circuit for relay CRC and this relay is therefore de-energized. The machine now comes to a complete stop and remains so until an auxiliary start button 163 is momentarily depressed. Depressing this button completes a circuit to energize the coil of relay CRC and close normally open contacts CRC–2 thereby completing a circuit to energize the group of number 2 stations in the various levels of the patchboard unit. The machine now performs the second step of the cycle and will come to a complete stop immediately thereafter. This process may, of course, be repeated for the entire cycle of operation so that the machine operator may check the position of the tool at the beginning and end of each step and, if necessary, readjust the grid dogs.

It will be understood that during the set-up of the machine the table speed and tool feed rate which are desired for the initial machining step of the cycle are preferably preset in the machine. After the machine has been completely set-up, the operator moves the three-position selector switch 160 to the automatic cycle position and momentarily depresses the cycle start button 162. Depressing the start button 162 completes a circuit (not shown) to start rotation of the table 22 and also completes a circuit (Figure 2A) to energize relay CRC1. Energization of this relay closes contacts CRC1–1 and CRC1–2. Closing contacts CRC1–2 completes a circuit to the sequence switch coil 156 which causes the armature to shift its position. Releasing the start button 162 breaks the circuit to relay CRC1 whereby contacts CRC1–2 open whereby coil 156 is de-energized and the switch, which had been cocked by the original movement of the armature, now steps to move the wipers from home position to the first contacts of the respective banks by internal spring action as explained heretofore.

Closing the contacts CRC1–1 as mentioned above completes a circuit to energize control relay CRC thereby closing contacts CRC–1 (Figure 2A), CRC–2 (Figure 2B) and CRC–3 (Figure 2A). Closing the contacts CRC–1 completes a holding circuit for the relay CRC whereby this relay will remain energized after release of the start button and de-energization of relay CRC1. Closing the contacts CRC–2 readies the grid circuit for use in a manner to be described hereinafter. Closing contacts CRC–3 completes a circuit through control relay CRA thereby closing contacts CRA–1 and CRA–2 and opening contacts CRA–3, CRA–4 and CRA–5. Closing contacts CRA–1 completes a second locking circuit for the relay CRC. Closing the contacts CRA–2 completes a locking circuit to hold in relay CRA even though relay CRC may be de-energized.

From this point in the cycle, the machine is completely under the control of the automatic programming control system, and the sequential stepping through the cycle of operation is controlled by the grid limit switches or, in special cases, such as turret indexing, under the control of the limit switch associated therewith.

When the wipers of the sequence switch move to step 1, a circuit is completed from line 1 through normally closed contacts CR2–1, the sequence switch wiper of bank 96c, the jumper connecting the first stations of level i and level j, control relay CR–RT, contacts CRC–2, a line 166 and a line 168 to line 2. Energizing relay CR–RT closes contacts CR–RT–1 to start the rapid traverse motor 80 whereby rapid traverse motion is imparted to shaft 86. A circuit is also completed through the contacts CR2–1, the wiper of bank 96b of the sequence switch, the jumper connecting station #1 in level d and station #1 in level f, control relay CRI, contacts CRC–2 and lines 166 and 168 to line 2, whereby control relay CRI is energized and contacts CRI–1 closed. Closing these contacts actuates the In clutch 60 whereby the rapid traverse motion of shaft 86 is transmitted to the cross feed screw 58 and the tool carrying member therefore moves In at Rapid Traverse rate, until the dog H1 on the horizontal grid assembly strikes the corresponding limit switch H1 which closes to complete a circuit from line 1 through contacts CR2–1, through the bank 96a of the stepping switch, through the jumper connecting the #1 stations of levels b and c in the switchboard, through line 172, through grid switch H1, through line 174, through control relay CR1 and through line 168 to line 2, whereby the coil of control relay CR1 is energized. Energization of relay CR1 closes normally open contacts CR1–1 (Figure 2C) to complete a circuit to energize the coil 156 of the sequence switch whereupon the switch armature is moved to cock the switch spring and also to mechanically close interrupter contacts SS–1 of the sequence switch and energize the coil of relay CR2. Energizing relay CR2 opens the normally closed contacts CR2–1 and thereby breaks the circuit to the coil of relay CR1 and, as a consequence, opens contacts CR1–1 to stop the flow of current to the sequence switch coil. The spring now steps the sequence switch wipers to the #2 contacts and also causes mechanical opening of contacts SS–1 whereby relay CR2 is de-energized and contacts CR2–1 closed. It should be noted that energization of relay CR2 and the opening of normally closed contacts CR2–1 preferably occurs before the stepping of the switch which therefore takes place when no current is flowing across the stepping switch contacts.

The tool carrying member, after a predetermined distance of travel, causes dog H1 to engage its horizontal limit switch H1, at which time the stepping switch wipers step to the second set of contacts of the related banks, in the same manner as described above.

With the wipers at the second set of contacts of the related banks in the stepping switch, a circuit is completed through the second contact of bank 96d of the switch, and through the jumper connecting the #2 stations of levels j and l to energize relay CR–RT and thereby start the rapid traverse motor 80. A circuit is also completed through the second contact of bank 96c of the sequence switch and the jumper connecting the #2 stations of levels h and i to energize relay CRD thereby closing contacts CRD–1 to engage the Down magnetic clutch 66. The tool carrying member now moves Down in Rapid Traverse for a predetermined distance at which time the V1 grid dog closes limit switch V1 to complete a circuit through CR1, to step the stepping switch wipers to contacts #3 of their respective banks.

In a manner similar to that described above, a circuit is now completed through the wiper and stepping switch contact #3 of bank 96d, and the jumper from the third station of level l to level k, through relay CR–PS and through lines 166 and 168 to line 2. Energization of the relay CR–PS closes contacts CR–PS–1 and CR–PS–2. Closing the contacts CR–PS–1 starts the positioning motor which transmits a slow rate of motion to shaft 86. Closing contacts CR–PS–2 disengages the solenoid operated clutch 90 thereby disconnecting the transmission from the drive shaft 52. A circuit is also completed through the wiper and #3 contact of bank 96c of the stepping switch, and the jumper connecting stations #3 of levels h and i thereby energizing relay CRD and closing contacts CRD–1 to engage the Down magnetic clutch 66. The positioning speed rotation of shaft 86 is therefore transmitted to the vertical feed rod 56, and the tool carrying member moves Down at positioning speed for a predetermined distance at which time the grid dog V2 closes limit switch V2 to complete a circuit through CR1 for stepping the stepping switch wipers to contacts #4 of their respective banks.

A circuit is now completed through the stepping switch and the jumper connecting #4 stations of levels d and f in the switchboard whereby control relay CRI is energized and the tool carrying member now moves In at the preset feed rate for a predetermined distance until the grid dog H4 closes limit switch H4 thereby closing a circuit through CR1 to step the stepping switch wipers to contacts #5 of their respective banks.

Circuits are now completed through the stepping switch and the jumpers at #5 stations of levels j and l, g and i, and e and f of the switchboard to energize relays CR–RT, CRU and CRO, respectively. At this time both the Up clutch 64 and Out clutch 62 are energized whereby the rapid traverse motion of shaft 86 is transmitted to the rod 56 as well as the cross feed screw 58 whereby the tool carrying member Rapid Traverses outwardly and upwardly at a 45° angle for a predetermined distance at which time the grid dog V3 closes switch V3 to energize CR1 and thereby cause the wipers of the stepping switch to be moved to contacts #6 of the related banks.

Circuits are now completed through the sequence switch contacts and stations #6 of the switchboard as indicated in Figure 4 to cause the tool carrying member to move Out in Rapid Traverse for a predetermined distance at which time the grid dog H5 closes grid switch H5 whereby the stepping switch is caused to be stepped to contacts #7 in the manner described earlier.

A circuit is now completed through the #7 contact of bank 96f of the stepping switch and through the jumper connecting station #7 of level q to the station HM to energize relay CRHM. Energizing relay CRHM closes normally open contacts CRHM–1 and opens normally closed contacts CRHM–2. Opening contacts CRHM–2 breaks the circuit through relay CRA to thereby de-energize this relay. De-energizing relay CRA opens contacts CRA–1 to break one of the holding circuits for relay CRC. De-energizing relay CRA also causes normally closed contacts CRA–5 to close.

Closing contacts CRHM–1 completes a circuit through line 1, contacts SS–2, contacts CRHM–1, contacts CRC–4, contacts CRA–5 and relay CRQ to line 2. Energizing relay CRQ closes contacts CRQ-1 to form a holding circuit for relay CRQ, and also closes contacts CRQ-2. Closing contacts CRQ-2 completes a circuit which bypasses the sequence switch, grid switch and switchboard. This circuit may be traced from line 1 through contacts CR2–1, through line 180, contacts CRQ-2, line 182, line 174, the coil of relay CR1 and line 168 to line 2. Relay CR1 is thereby energized.

Energizing relay CR1 closes normally open contacts CR1–1 and opens normally closed contacts CR1–3.

Opening contacts CR1–3 breaks the holding circuit for relay CRC thereby causing this relay to be de-energized. Closing contacts CR1–1 energizes the sequence switch coil which cocks the switch as described heretofore and also mechanically closes contacts SS–1. Closing these latter contacts completes a circuit to energize relay CR2 thereby opening normally closed contacts CR2–1 at which time the switch steps. The stepping of the switch opens contacts SS–1 thereby de-energizing relay CR2 and causes contacts CR2–1 to close. Once again relay CR1 is energized and the stepping process is repeated. As long as relay CRQ remains energized and contacts CRQ–2 remain closed, this stepping operation is repeated in rapid succession until the sequence switch wipers reach the "O" or home position at which time the contacts SS–2 in the switch are mechanically opened by a finger (not shown), also in the switch, thereby dropping out relay CRQ.

The above description of an abbreviated cycle of operation indicates that the machine's functions are responsive to selectable preset jumpers on the switchboard which are selectively energized by the sequential stepping of the sequence switch. The sequence switch in turn is responsive to the tripping, by preset dogs, of the horizontal and vertical grid limit switches which are coordinated with the sequence switch through the switchboard unit.

If the horizontal and vertical grid switches were wired directly to the sequence switch to cause the sequential stepping to occur, then each particular step on the sequence switch would be limited to only one horizontal or vertical grid switch. If under these conditions a cycle were going to be set up, the machine would be limited to only one particular sequence of horizontal and vertical movements unless the horizontal and vertical grid switches were themselves tied together. Even though tying corresponding horizontal and vertical grid switches together would permit variations in the sequence of horizontal and vertical movements, when either a horizontal or vertical grid switch was utilized for a particular step, the corresponding unused horizontal or vertical grid switch of the same number would be lost.

As an example of the advantages of isolating the horizontal and vertical grid switches and correlating the switches with the sequence switch through a switchboard unit, a comparison may be made to certain prior art devices. In one of these prior art devices, namely, the device shown in Patent No. 2,427,493, issued September 16, 1947, to Bullard, in which, for example, there are eight horizontal limit switches and eight vertical limit switches, only eight steps total in any combination may be performed. Utilizing the system disclosed in the instant invention, if eight horizontal and eight vertical limit switches were utilized, a maximum of sixteen steps total could be performed.

Referring to the instant disclosure, wherein a stepping switch having provision for 48 steps is utilized, the horizontal and vertical grids in one instance might be provided with 48 switches each and in this case several cycles of operation for several workpieces could be set up on one board 94. On the other hand, in another instance horizontal and vertical grids may be provided, each having in the neighborhood of 24 limit switches which are sufficient to accommodate almost any conceivable cycle of operation.

*Insertion of cycle steps and miscellaneous functions*

After a particular cycle has been set up and utilized in a programming system, it may at times be desirable to insert additional steps between any of the original steps of the cycle of operation. In the following example the simple manner of accomplishing this feature will be explained. Also various other features of the novel programming control system and the advantages thereof will be explained.

In existing programming control systems, the insertion of several steps into a preset cycle of operation is time consuming and costly. The primary reason for this is because the function control means and function determining means generally are tied together in a given sequence and cannot be used in random sequence. For example, if the cycle of operation having 25 steps, it is desired to insert three additional steps between steps four and five of the original cycle, it is necessary to remove and replace all of the function control means from the fifth step onward, meanwhile inserting the three additional steps. The greatest disadvantage, however, would be that the function terminating dogs for steps 5 through 25 would have to be completely repositioned along with the positioning of the three dogs for the inserted steps. A job such as this would require many hours of time and would be almost equivalent to a completely new setup, especially if any accurate machining were to be done.

In the device of the present disclosure, it would only be necessary to move the ends of the jumpers connected to levels $b$ and $d$ through $q$ of the switchboard 120$a$ from steps 5 through 25 three positions to the right and insert jumpers for the three additional steps. The ends of the jumpers connected to levels $a$ and $c$ are not changed because the grid dogs, already adjusted and utilized to terminate a particular function, will still be utilized to terminate the same functions, even though these functions occur at a different point in the cycle. As these jumpers are merely plugged in, this procedure takes very little time. The greatest saving, however, occurs in the change-over at the horizontal and vertical grids. At the grids, all of the dogs which had been utilized in the original setup of 25 steps would remain exactly the same and only the dogs for the three additional steps would have to be accurately located. This feature obviously greatly cuts down the time required for a change-over and is possible solely because the grid dogs and switches may be used in any random manner throughout a cycle of operation and are always correlated with the sequence switch through the switchboard unit.

Referring now to a simple cycle of operation which involves a modification of the previously described cycle, and for purposes of illustration, assuming that it is intended to modify the program of Figure 3 into the program of Figure 5, the modified program may be set up as indicated in the following schedule, wherein the added functions are indicated as program steps 4$a$ through 4$h$ inclusive. It should be particularly noted that the revised program to be described hereinafter is for purposes of illustration only in order to explain in a simple manner how cycle steps may be added or inserted. In actual practice it would be more likely that a machining step would be inserted between two formerly used machining steps. However, the same basic principles would apply in either case.

| Sequence Switch Contacts | Program Step and Function | Function Terminating Grid Switch |
|---|---|---|
| 1 | 1—Rapid Traverse In | Horiz. #1. |
| 2 | 2—Rapid Traverse Down | Vert. #1. |
| 3 | 3—Position Down, Preselect 2d Feed and Speed. | Vert. #2. |
| 4 | 4—Travel In (1st Feed Rate) | Horiz. #4. |
| 5 | 4$a$—Travel Up (1st Feed Rate) | Vert. #4. |
| 6 | 4$b$—Change to 2d Speed | None. |
| 7 | 4$c$—Change to 2d Feed | None. |
| 8 | 4$d$—Travel In (2d Feed Rate and 2d Table Speed). | Horiz. #6. |
| 9 | 4$e$—Rapid Traverse Out | Horiz. #7. |
| 10 | 4$f$—Turret Index | 102. |
| 11 | 4$g$—Rapid Traverse In | Horiz. #8. |
| 12 | 4$h$—Travel In (2d Feed and Table Speed), Preselect 1st Speed and Feed. | Horiz. #6. |
| 13 | 5—Rapid Traverse at 45° (Out, Up and Rapid Traverse). | Vert. #3. |
| 14 | 5$a$—Change to 1st Feed | |
| 15 | 6—Rapid Traverse Out | Horiz. #5. |
| 16 | 6$a$—Change to 1st Speed | |
| 17 | 7—Step Switch Home | |

Figure 6:
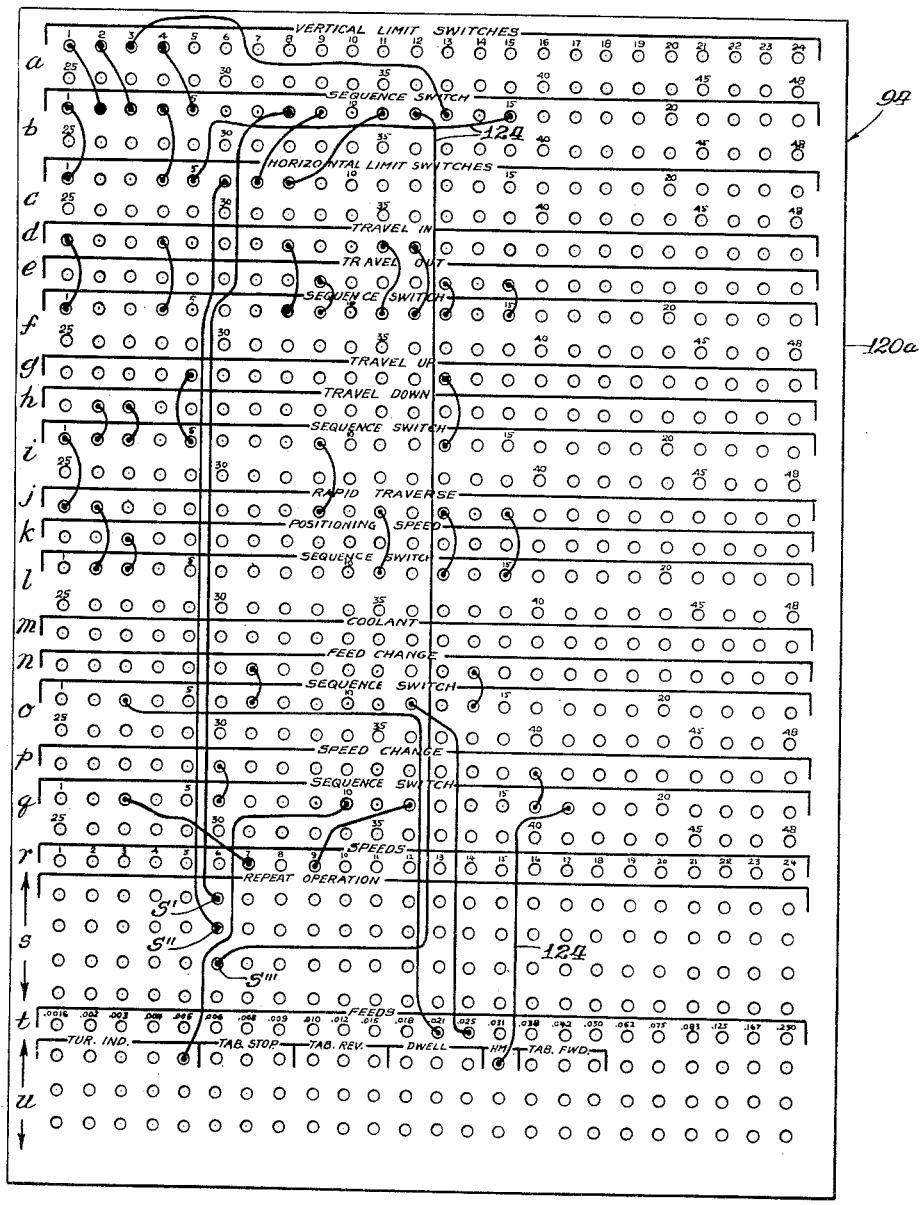
Figure 6 is a view of the modified switchboard as set up to control the cycle shown in Figure 5.

The switchboard 120a, as set up for the modified cycle of operation, is indicated in Figure 6 and it is apparent that the jumpers for the first four steps (all of the steps prior to the insertions) remain exactly as they were in the original setup indicated in Figure 4. However, jumpers are added at step 3 for the preselection of a feed and speed. These functions do not require grid stops. For the speed preselection a connection is made by a jumper from one of the stations in function level r to station #3 in sequence level q. It should be understood that each of the stations in level r represents a different table speed and the appropriate connection must be made to preselect a table speed which is desired at a later point in the cycle. A connection is also made for preselecting a forthcoming tool feed change and this connection, for example, is from feed .021 in level t to station #3 in sequence level o. The preselection operation constitutes a positioning of selection device 192 so that a specific preselected combination of torque motors 70, 72, 74, 76 and 78 will be energized at a later point in the cycle to change the feed rate. For simplicity the preselection of a new tool feed and table speed have been indicated as occurring at the same step. However, it will be apparent that the new feed and speed may, if desired, be preselected at two separate steps of the cycle of operation.

Figure 5:
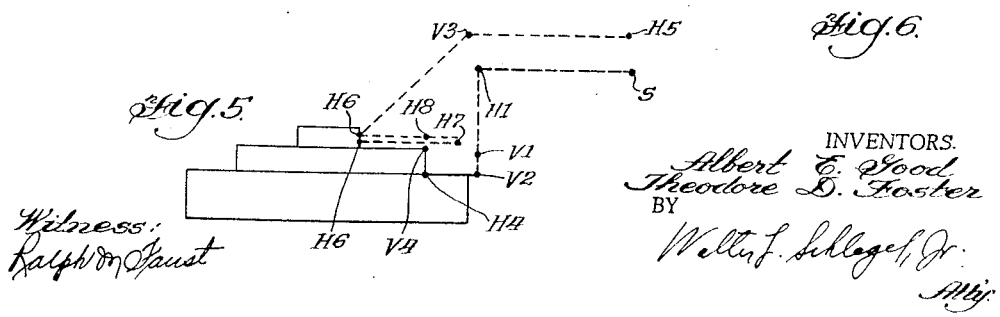
Figure 5 is a diagrammatic illustration of another workpiece and the cycle of operation by which the workpiece may be formed.

It should be noted that the drawings of Figures 3 and 5 are not to exactly the same scale. However, the various points representing grid dogs common to both figures are not varied in the two setups. All of the jumpers following step 4 are moved to the right, as indicated in Figure 6, a sufficient number of stations to accommodate the required insertions. At the function levels both ends of the jumpers may be moved. However, at the correlating portion, including levels a to c, only the sequence switch end of each jumper in portion b is moved while the other end of each jumper is not moved. The reason for this is that the same grid dogs which were used in the prior cycle to teriminate these functions are used in the modified cycle, thereby obviating the repositioning of these dogs. This unique feature, as explained heretofore, is one of the important advantages of the invention. The inserted steps are as follows:

For step 4a of the cycle, station #5 in level g, representing travel Up, is connected to station #5 in level i and station #5 in level b is connected to station #4 of level a.

For step 4b, station #6 of level p, representing speed change, is connected to station #6 in sequence level q.

For step 4c, station #7 of level n, representing feed change, is connected to station #7 in sequence level o.

For step 4d, station #8 of level d, representing level In, is connected to station #8 in sequence level f, and station #8 in sequence level b is connected by a jumper to any of the repeat operation stations, as S', in any group, as for example group #6. Station #6 of horizontal limit switch level c is connected to any other repeat operation station in group #6, as for example S''.

For step 4e, station #9 of level e, representing travel Out, is connected to station #9 in sequence level f and station #9 of level j, representing Rapid Traverse, is connected to station #9 in level i. In the sequence portion station #9 in level b is connected to station #7 in level c.

For step 4f of the cycle, any of the turret index stations in level u is connected by a jumper to any of the sequence switch stations #10 as for example in level q. For this particular step no connection is made at the sequence portion of the switchboard because termination of the turret indexing function is determined by a switch 102 (Figure 2B) which is closed by the turret at the completion of the indexing thereof. The circuit may be traced from line 1, through line 184, switch 102, line 174, relay CR1 and line 168 to line 2. Energization of the coil of relay CR1 closes contacts CR1-1 whereby coil 156 is energized and the stepping switch 96 steps in the manner described heretofore.

For step 4g of the modified cycle of operation, station #11 of function level d, representing travel In, is connected to station #11 in sequence level f. Station #11 of function level j, representing Rapid Traverse, is connected by a jumper to station #11 in sequence level l. At the sequence portion, station #11 in sequence level b is connected to horizontal limit switch station #8 in level c.

For step 4h of the cycle, station #12 of function level d, representing travel In, is connected to station #12 of sequence level f. In the sequence portion of the switchboard station #12, of level b is connected by a jumper to a third contact of the repeat operation stations of group #6 such as S'''. Additionally, a connection is made by a jumper from the #12 station in level q to the particular station in level r representing the original table speed. A connection is also made from the #12 station of level o to the particular station in level t representing the original tool feed.

The remaining connections, except those required for speed and feed change, are identical with those for steps 5, 6 and 7 of the set up for the original cycle of operation, except that the sequence switch connections are made several stations to the right as viewed in Figures 4 and 6. However, for clarity these connections are re-enumerated as follows.

For step 5, Rapid Traverse station #13 of level j is connected to station #13 of level l. Station #13 of function level e, representing travel Out, is connected to station #13 of level f. Station #13 of function level g, representing travel Up, is connected to station #13 of sequence level i. Station #13 of sequence level b is connected to vertical limit switch station #3 of sequence level a.

For step 5a of the cycle, a jumper is connected from the #14 station of sequence level o to the #14 station of level n.

For step 6, Rapid Traverse station #15 of level j is connected to station #15 of level l. Station #15 of level e, representing travel Out, is connected to station #15 of sequence level f, and station #15 of sequence level b is connected to horizontal limit switch station #5 of level c.

For step 6a a jumper is connected from the #16 station of level q to the #16 station of level p.

For step 7, station #17 of sequence level q is connected to the home station in level u.

The preselection step at 4h and the feed and speed changes at steps 5a and 6a, respectively, are necessary so that at the end of the cycle of operation, all of the conditions will be the same as at the beginning of the cycle.

It should be noted at this time that it is not necessary to utilize the horizontal and vertical grid switches in any particular sequence. This is possible because correlation of the grid switches to the sequence switch steps or function steps may always be accommodated through the switchboard.

Referring now to the manner of operation of the machine as modified by the new switchboard, setup steps 1 through 4 are identical with those described in the preceding example except for the preselection of a tool feed and table speed which will be required at a subsequent portion of the cycle of operation. During step 3, position Down, a circuit is also completed through the bank 96f of the stepping switch and the jumper connecting station #3 of sequence level q to station #7, for example, of level r to actuate the table speed selection device indicated generally at 190. As noted heretofore the table speed transmission (not shown) comprises a plurality of shafts each having a plurality of gears engageable in different combinations to provide various gear trains. Each gear train, when used, imparts a different speed to the table. The gear trains are selected by means of a plurality of cluches (not shown) actuated by shifter forks (not shown). A preselector device 190 is provided whereby a shifter fork actuating mechanism is positioned according to a desired preselected speed. In this manner the preselection and prepositioning is accomplished during a step prior to the step in which the speed change is required at which time it is only necessary for the shifter actuating mechanism to quickly shift the forks and cause them to engage the clutches with the proper gears. This mechanism is explained in detail in the aforementioned copending application Serial No. 589,537 and therefore is mentioned here only briefly. Because the cycle being described will utilize a different speed during step 4d, the preselection and positioning is set up in an earlier step, namely, step 3.

Similarly, with the sequence switch wipers at their #3 contacts, a circuit is completed through bank 96e and the jumper connecting the #3 station of level o with a "feed" station in level t. In the present example it is assumed that, at a subsequent step of the cycle of operation, a tool feed rate of .021" per revolution will be required. Energizing this particular station of level t actuates the selection device 192 which determines which one or combination of torque motors 70, 72, 74, 76 and 78 will later be energized to initiate a new feed rate. Then at the particular step at which the new feed rate is desired, these motors are energized and rotate an amount and in a direction determined by the rotary solenoid selection device and thereby shift the necessary gears in the feed box transmission to set up the proper gear train for that desired tool member feed. The rotary solenoid selection device 192 is shown only schematically and not described in detail because it is not a part of the present invention.

After completion of step 4, inserted step 4a will occur. When the sequence switch wipers step to contacts #5, of the related banks, a circuit is completed through the jumper from station #5 of level g to station #5 of level i, in the same manner as described heretofore, whereby relay CRU is energized to close contacts CRU-1. Closing these contacts engages the Up electro-magnetic clutch 64 and, as a consequence, the tool carrying member moves up at the feed rate preset.

At the end of a predetermined distance of travel, grid dog V4 closes vertical limit switch V4 at which time the motion of the tool carrying member is terminated and the sequence switch wipers step to the #6 contacts of their respective banks in the manner described previously. At this time a circuit is completed through the jumper connecting the #6 stations of levels p and q to energize the coil of relay CR-SC. Energization of the relay CR-SC completes a circuit to cause actuation of the speed change mechanism (not shown) in accordance with the preselection made in step 3. This operation is explained in detail in the aforementioned copending application Serial No. 589,537 and for this reason is not described herein. The completion of the speed change is indicated by means of a limit switch (not shown) in a manner similar to that shown hereinafter for the turret indexing function. Also in a similar manner the limit switch causes the stepping of the sequence switch to the next succeeding set of contacts, in this case contacts #7.

With the sequence switch wiper at the #7 contacts, step 4c of the cycle occurs by the completion of a circuit through the #7 contacts and through the jumper connecting the #7 stations of levels n and o to energize the coil of relay CR-FC whereby certain of the torque motors 70, 72, 74, 76 and 78 are operated to shift the proper gears as predetermined in step 3 by the rotary solenoid selection device 192 so that a gear train is set up to provide a new tool feed rate. The termination of the feed rate change is once again signalized by means of a limit switch (not shown) in a similar manner to that shown for turret indexing and, also in a similar manner, the sequence switch wipers are caused to move to the #8 contacts.

Before going on to explain step 4d of the cycle, it should be noted that the feed rate change and the table speed change are set up in separate steps because a brief interval of time is required for the shifting of gears to take place and this interval is a variable factor.

With the sequence switch wipers at the #8 contacts, a circuit is now completed through the jumper connecting the #8 stations of levels d and f to energize control relay CRI whereby contacts CRI-1 are closed to engage the In electro-magnetic clutch 60 whereby the tool carrying member travels In at the newly selected feed rate for a predetermined distance at which time the grid dog H6 closes horizontal grid switch H6, thereby stepping the sequence switch wipers to contacts #9 of their respective banks. It should be noted here that station #8 of sequence level b is connected to horizontal limit switch station #6 in level c through contacts S' and S" which are wired to each other by jumpers as shown in Figure 6. The reason for this connection is that the H6 horizontal grid dog and switch will be re-used as hereinafter described.

With the stepping switch wipers on the #9 contacts of the respective switch banks, a circuit is completed through bank 96c of the sequence switch and the jumper connecting the #9 stations of levels i and j to energize relay CR-RT whereby contacts CR-RT-1 are closed to energize the rapid traverse motor 80. As described previously, operation of the rapid traverse motor rotates shaft 86 at a high rate of speed. This rapid speed is transmitted with proper rotational direction to the cross feed screw 58 by means of the Out electro-magnetic clutch 62 which is energized by a circuit through the bank 96b of the sequence switch and the jumper connecting the #9 stations of levels e and f whereby relay CRO is energized to close contacts CRO-1. This motion continues until grid switch H7 is closed causing the sequence switch wipers to step to the #10 contacts.

A circuit is now completed for inserted step 4f through bank 96f of the sequence switch and through the jumper connecting station #10 of level q to the turret index station in level u thereby energizing relay CR-TI to close contacts CR-TI-1 to actuate motor 191 and index the turret. At the completion of the indexing function a switch 102 is closed to complete a circuit from line 1 through line 184, the switch 102, line 186, line 174, through the relay CR1 and line 168 to line 2. The relay CR1 is thereby energized to cause the stepping switch to step to its contacts #11 in a manner described previously.

With the sequence switch wipers on contacts #11 of the related banks to initiate step 4g of the modified cycle, a circuit is completed through contact #11 of bank 96b of the switch and the jumper connecting stations #11 of levels d and f to energize relay CRI thereby closing contacts CRI-1 and engaging the In magnetic clutch 60. A circuit is also completed through the jumper connecting stations #11 of levels j and l in the same manner as described heretofore to energize relay CR-RT whereby contacts CR-RT-1 are closed to energize the rapid traverse motor 80. The tool member therefore now moves In at the rapid traverse rate until horizontal grid switch H8 is closed whereby the tool member motion is terminated and the sequence switch is stepped to contacts #12, initiating inserted step 4h of the cycle.

At step 4h a circuit is completed through sequence switch contacts #12 and the jumper connecting station #12 of levels d and f to energize relay CRI and close contacts CRI-1 whereby the In magnetic clutch 60 is engaged. The tool carrying member now moves In at the new feed rate. Simultaneously a circuit is completed through bank 96f of the sequence switch and the jumper connecting the #12 station of sequence level q to, for example, the #9 station of level r to actuate the table speed selection device, as explained heretofore, with reference to step 3, whereby the original table speed is once again preselected for a subsequent change thereto. Another circuit is simultaneously completed through bank 96e and the jumper connecting the #12 station of level o with the feed station in level t representing the tool feed utilized at the start of the cycle whereby the selection device 192 is actuated as described heretofore with reference to step 3. The In motion continues until the horizontal grid switch H6 is closed at which time the motion is terminated and the sequence switch wipers are stepped to contacts #13.

The three remaining steps, namely, 5, 6 and 7 are identical with the steps 5, 6 and 7 of the cycle described in connection with Figure 4 except that the feed and speed preselected in step 4h are changed in steps 5a and 6a, respectively. The feed and speed changes occur in the same manner as described in the steps 4b and 4c of the cycle. For this reason it is not believed necessary to describe these steps in detail at this point.

It will be apparent to those skilled in the art that the modified cycle of operation described herein is given merely to illustrate certain operational characteristics of the programming control mechanism. As a practical matter an existing cycle of operation would probably be modified by inserting an additional machining step (or steps) between machining steps of the existing cycle rather than by the addition of a machining step as in the disclosed modified cycle.

It is also apparent from the above description of a modified cycle of operation that the revised switchboard including the added steps could be set up in a matter of minutes and that this would represent the only down time of the machine, except for the positioning of the added grid dogs. This advantage is possible because the grid dogs and switches are not restricted to use with any particular step of the sequence switch.

It should also be noted that any functions which are combined or tied together at any particular step of a cycle of operation are immediately isolated when the sequence switch steps and will remain isolated unless once again combined or tied together by jumpers at a sequential step.

Another feature which is brought out by the above described cycle is that any function may be repeated in a cycle of operation, that is, any tool movement along a given path at a given speed and for a given distance may be repeated as often as desired along the same path and at the same speed for the same distance.

A very important feature of the device is the ability to utilize, through the switchboard, one particular grid stop and switch to terminate a plurality of functions. In other existing devices, when it is desired to repeat a function having identical points of termination, it is necessary to utilize different distance determining means for each of the functions because each distance determining means is restricted to use with only one step of the cycle of operation. On the other hand, in the present invention, the separate steps on the sequence switch, as well as the grid dogs and their switches, are completely independent of each other and are correlated by means of the switchboard. For this reason any repeated functions may be terminated by the same grid dog and switch. In the example given above, horizontal grid switch #6 is utilized to terminate steps 4d and 4h and in an actual cycle of operation, the particular grid stop and switch might be used far more often.

Another advantage of utilizing the disclosed switchboard is the convenience and slight expense of storing the removable panel as set up for a particular cycle of operation and thereby having it available for immediate use at a future time. In other existing program control systems, the storage of the function control means is prohibitively expensive.

Use of plurality of tool carrying members

At times it is desirable to use a plurality of tool carrying members adapted to perform certain operations, either sequentially or concurrently, on a workpiece. For example, it may be desirable to use a turret head and a side head, each head performing certain functions. In a case such as this a separate programming control mechanism is provided for the side head. As this unit is the same in every respect as the control unit described above for the turret head, it is not necessary to illustrate or describe the parts thereof.

When a plurality of programming control systems are utilized, it is desirable that the activity of each control system is adapted to be initiated by the activity of the other control system. The reason for this is that both machine heads might not be used during all portions of a cycle of operation but, more frequently, the heads are used concurrently during certain portions of the cycle and separately during other portions of the cycle.

Assume, for purposes of illustration, that a turret head and a side head are to be used to machine a workpiece, and the turret head is to move through certain steps of a cycle of operation under control of the novel programming system herein disclosed. At step 5, for example, of the cycle, it is desired to start the side head into operation. The preselection programming setup is accomplished in the following manner and is shown in the simplified diagram of Figure 7.

Figure 7:
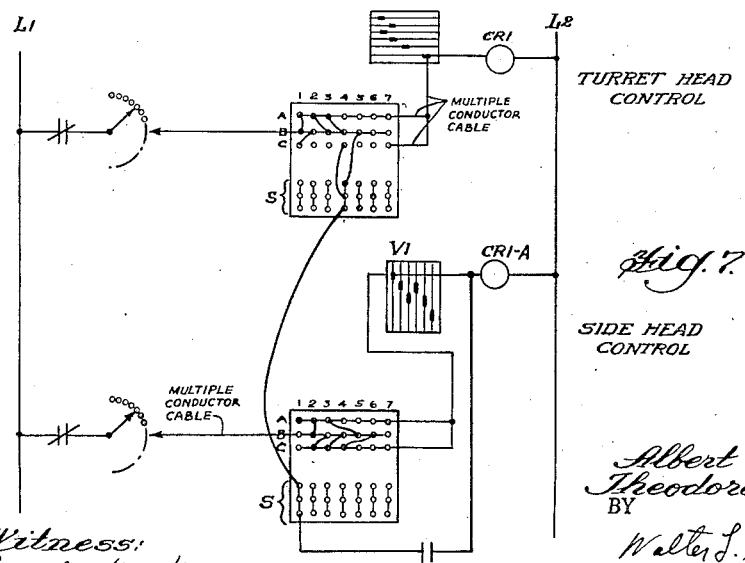
Figure 7 is a schematic diagram of a control system for controlling a plurality of tool carrying members, each of which has a control system associated therewith such as that shown in Figures 2A, 2B, and 2C.

Referring to Figure 7, it is seen that the #1 stations of the side head switchboard are left open. The first function which the side head is to perform is set up in the #2 stations and sequential functions are set up in succeeding stations. The connection between sequence switch station #5 of correlating portion B of the turret head switchboard and its function terminating grid switch station (#4 in portion C) is made through the repeat operation stations in the same manner as described heretofore relative to the repeat use of a stop. A jumper is also connected from a repeat operation station of the same group to a repeat operation station of group 1 of the side head switchboard. These repeat operation stations are also set up as part of a circuit including normally open contacts CR1-8 controlled by relay CR1 of the turret head and a relay CR1-A.

At the beginning of the cycle, the operator depresses the cycle start buttons for both the turret head control system and the side head control system thereby stepping both sequence switches to the first set of contacts in a manner described heretofore. The turret head will, of course, begin to perform its various functions but the side head will remain stationary because no functions have been set up in the #1 stations of its switchboard. When the turret head moves to step 5, a circuit is completed through the #5 contacts of the turret head sequence switch, the jumper connecting correlating sequence switch station #5 of the turret head switchboard to the repeat operation station, through the jumper connecting the adjacent repeat operation station to station #1 of the repeat operation portion of the side head switchboard through the closed contacts CR1-8 and through the side head control relay CR1 to line 2. It will be recalled that energization of relay CR1 causes the stepping switch to step to the next set of contacts. Similarly, completing this circuit energizes the coil of the side head control relay CR1-A whereby the side head sequence switch is stepped to contacts #2. The side head now moves under programming control in accordance with the preset jumpers setup in the #2 stations of the side head switchboard and the side head will continue to move through sequential steps in the manner described relative to turret head operation.

Miscellaneous

Generally during a cycle of operation it is desirable to use coolant fluid. When this occasion arises, it is merely necessary to insert a jumper in the switchboard connecting one of the coolant stations of portion M with a sequence switch station corresponding to the step of the cycle in which the coolant is required. When this step in the cycle is reached, a circuit is completed to energize a relay CRCL to close the contacts CRCL–1 and operate the coolant motor 196 so that coolant fluid will be delivered in a conventional manner.

Referring for a moment to the wiring diagram of Figure 2A, it is seen that an indicating light 198 is wired in parallel with the relay CRC. As the relay CRC is energized only when the machine is operating under automatic programming control the light 198 is operated at that time and serves as an indication to the operator that the machine is completely under the control of the programming system.

Provision is made for operating the machine by Pendant control completely isolated from the automatic programming control. In order to operate the machine in this manner the three-position selector switch 160 is moved to the Pendant position. With the switch 160 in this position, the relay CRM is energized and normally closed contacts CRM–1 are opened whereby the control relay CRC cannot be energized and, as a consequence, the automatic programming portion of the circuit is rendered ineffective.

Provision has also been made whereby it is possible to step the sequence switch either in rapid steps or in slow steps having a predetermined time interval between each step, in either case without operating any other portion of the programming control system or operating any of the machine elements. This may be desirable if, for example, a plurality of jobs have been set up on a single removable patchboard and the machine operator desires to machine workpieces having a cycle of operation preset at stations 30 through 40 of the patchboard. Obviously it would be undesirable to operate the machine through all the steps preset in the patchboard at stations 1 through 29. However, as will be described hereinafter, in the novel programming control disclosed herein the machine operator merely steps the sequence switch rapidly to a desired position without affecting the function control relays. This may also be necessary if, for example, the operator desires to replace a broken tool which is utilized, for example, at step #47 of a particular cycle of operation. In a case such as this the operator would not want to spend the time running the machine through the entire cycle of operation to get to step 47. Instead he would step the sequence switch rapidly in a manner to be described, to approximately station #40 and then at a slower rate to station #46. Before describing the manner in which this would be done, it should be noted that the sequence switch is capable of stepping at the rate of 80 steps per second.

To perform the above operation, the three-position selector switch 160 is moved to the Pendant position and the "Fast" buttton of switch 161 is depressed by the operator to thereby close contacts B—B. A circuit is now completed from line 1 through contacts CR2–1, line 180, the closed contacts of switch 161, line 182, line 174, relay CR1 and line 168 to line 2. Relay CR1 is thereby energized to close contacts CR1–1 to energize the coil 156 of the sequence switch and cock the switch. As described earlier, cocking the switch mechanically closes interrupter contacts SS–1 to complete a circuit to energize relay CR2 thereby opening contacts CR2–1. Opening contacts CR2–1 breaks the circuit through relay CR1 thereby de-energizing the coil thereof and causing contacts CR1–1 to open so that the switch will step. As the switch steps, interrupter contacts SS–1 are opened thereby de-energizing the coil of relay CR2 and causing contacts CR2–1 to close. Closing contacts CR2–1 again completes a circuit through relay CR1 and this cycle continues to be repeated at the rate of 80 steps per second until the sequence switch approaches step 40 at which time the operator releases the "Fast" buttton of switch 161.

The operator now depresses the "Slow" button of switch 161 to close contacts A—A thereof and complete a circuit through time delay relay TDR. Energizing this relay closes normally open contacts TDR–1, but only after a predetermined time interval as set in the time delay relay. In this manner, a circuit is completed to energize relay CR1 and cause the sequence switch to step at a slower rate than previously so that when step 46 is reached, the operator may release the "Slow" button of switch 161 at which time the switch ceases to step. The tool is now replaced and the operator, by Pendant control, moves the head to bring the tool to a position immediately ahead of the point in the cycle at which the tool break occurred. The operator then turns the three position selector switch to "automatic" position and presses the "Advance" push button 163. The programming control system now takes over and continues from that point to the end of the cycle. Normally closed contacts CRA–3 and CRA–4 are provided as a safety measure so that the "Slow-Fast" switch 161 is rendered ineffective while the machine is under automatic programming control.

Figure 9 illustrates another embodiment of a stationary panel, designated 110b, which may be utilized in the novel programming control. This embodiment demonstrates that the connections to energize selected function control relays may be made in ways other than through a removable panel and demonstrates further that the function levels may be completely eliminated from the stationary panel. A programming control incorporating the panel of Figure 9 does not have the versatility or flexibility of the earlier described embodiment, nor can a specific job program be set up at a point remote from the machine on which the job is to be performed. However, the advantages of complete isolation of the horizontal and vertical grid switches, the random use thereof, the insertion of steps in a cycle of operation without repositioning grid dogs, the repeat use of a particular grid switch, and the ability to repeat identical steps of a cycle of operation are present when utilizing panel 110b without a removable panel as well as when utilizing panel 110 or panel 110a with a removable panel.

Referring to Figure 9, the panel 110b comprises a plurality of sequence levels A", C", E", F", G" and H", each comprising a plurality of stations insulated from each other and connected by individual wires of multiple conductor cables 176a to corresponding contacts of respective banks of the sequence stepping switch 96. It is to be understood that the stations of respective sequence levels are connected to corresponding contacts of respective banks of the stepping switch as in the previously described embodiments. The panel 110b also comprises a level B" having a plurality of stations insulated from each other and wired to corresponding vertical grid switches in the same manner as in the earlier described embodiments. Another level D" is similarly comprised of a plurality of stations insulated from each other and wired to corresponding horizontal grid switches. A level I" of panel 110b comprises a "home" station designated HM and a plurality of interconnected repeat operation stations.

The panel 110b of Figure 9 is shown set up to perform the cycle of operation illustrated in Figure 3. For the first step of the cycle, a jumper is connected from the 1st station of level F" to one terminal of a multi-terminal plug designated 220. The plug 220 comprises a plurality of receptacles connected to control relay CR–I for actuating the In magnetic clutch 60 (Figure 2C). Another jumper is connected from the 1st station of level E" to a plug 222, the receptacles of which are connected to control relay CR–RT. Another jumper is connected from the 1st station of sequence level A" to the #1 station of level D", the stations of which are wired to the respective horizontal grid switches, as above described.

For the second step of the cycle, a jumper is connected from the #2 station of sequence level H", or an unused #2 station of any other sequence level, to a plug 224 which is connected to control relay CR–PS; a second jumper is connected from the #2 station of sequence level F" to plug 220; a third jumper is connected from the #2 station of sequence level C" to station H3 of horizontal grid switch level D".

For the third step of the operational cycle, a jumper is connected from the #3 station of sequence level G" to a receptacle of a plug 226 connected to control relay CR–D. Another jumper is connected from the #3 switch station of sequence level F" to the plug 222. Another jumper is connected from the #3 station of sequence level A" to the V1 station of vertical grid switch level B".

For the fourth operational step, a jumper is connected from the #4 station of sequence level H" to a receptacle of plug 226. Another jumper is connected from the #4 station of sequence level G" to a receptacle of plug 224. Another jumper is connected from the #4 station of sequence level E" to station V2 of vertical grid switch level B".

For the fifth step of the cycle of operation, a jumper is connected from the #5 station of sequence level G" to the plug 220, and another jumper is connected from the #5 station of sequence level C" to the H4 station of horizontal grid switch level D".

For the sixth operational step, a jumper is connected from the #6 station of sequence level H" to a receptacle of a plug 228 which is connected to control relay CR–U. Another jumper is connected from the #6 station of sequence level G" to a plug 230 which is connected to control relay CR–O. A jumper is also connected from the #6 station of sequence level E" to a receptacle of plug 222, and another jumper is connected from the #6 station of sequence level C" to the V3 station of vertical grid switch level B".

For the last step of the cycle of operation, a jumper is connected from the #7 station of sequence level G" to a receptacle of plug 230. Another jumper is connected from the #7 station of sequence level C" to a receptacle of plug 222 and another jumper is connected from the #7 station of sequence level E" to station H5 of horizontal grid switch level D".

To return the sequence switch to the home position, a jumper is connected from the #8 station of sequence level H" to the home station of level I".

It should be noted that any connection to a particular station at a sequence switch level may be made to the corresponding station of any of the sequence switch levels. In Figure 9 plugs are shown for accommodating six functions. If functions other than those illustrated are required for a particular cycle of operation, it is only necessary to provide additional plugs connected to appropriate control relays. In this manner any of the functions which may be performed when utilizing the earlier described embodiments may also be performed when utilizing the panel of Figure 9.

The manner of operation of the programming control when utilizing the panel of Figure 9 is identical with that described heretofore relative to the other embodiments of the invention and therefore is not described herein.

Although the invention has been described as applied to automatic programming control of a vertical boring mill, it is readily adaptable for many other purposes. For example, the programming system may be utilized to control sequential functions of other types of metal working machines such as horizontal mills, lathes, presses and the like. It may also be utilized for numerous applications outside of the metal working field such as in automatic welding equipment control or control of processing equipment.

We claim:
1. In a machine tool adapted to perform a plurality of functions and having a rotatable member, an indexable member and a lineally movable member, separate means for rotating, indexing and moving the respective members; a first circuit comprising multi-banked switch means having a plurality of contacts, one for each sequential step in a cycle of operation, a plurality of function control contacts adapted to be interconnected with respective switch means contacts for initiating, when energized, any function of which the machine tool is capable and adapted to be connected into said circuit in sequential order by said switch means; and a second circuit comprising successive steps of one bank of said switch means, adjustable contact means actuatable in response to said lineal movement for terminating the motion of said lineally movable member and for simultaneously actuating said switch means, and presettable means for interconnecting any of said adjustable contact means with any of said bank steps.

2. In an automatic programming device for a mechanism having a plurality of functions; the combination of a control having a plurality of levels insulated from each other, each level comprising a plurality of electrical contacts insulated from each other, sequence switch means having a plurality of contacts insulated from each other and arranged in banks corresponding to respective levels, the contacts of each bank being wired to the respective contacts of the related level, independent switch means closeable in response to respective functions of the mechanism, sequence switch means having other contacts movable in steps along the contacts of the respective banks, means for stepping said movable contacts, means for effecting said functions, electrical connector means for connecting respective effecting means to any of the contacts of certain levels, and electrical connector means for connecting any of said function responsive switch means to any of the contacts of other of said levels, the function responsive switch means connected to an energized level contact when closed energizing said stepping means to move the movable contacts at least one step.

3. In an automatic programming device for apparatus having means for effecting a plurality of functions; the combination of a panel having a plurality of levels insulated from each other, each level comprising a plurality of electrical contacts insulated from each other, sequence switch means having a plurality of contacts insulated from each other and arranged in banks corresponding to respective levels, said switch means having other contacts movable in steps along the contacts of the respective banks, electrical operating means for so moving said movable contacts, the contacts of each level being electrically connected to the respective contacts of the corresponding bank, and independent switch means responsive to the respective functions and electrically connected to certain contacts of said panel for energizing said operating means, said function effecting means being electrically connected to other contacts of said panel for energization by said movable contacts.

4. In an automatic programming device for apparatus having means for effecting a plurality of functions; the combination of a panel having a plurality of levels insulated from each other, each level comprising a plurality of electrical contacts insulated from each other, sequence switch means having a plurality of contacts insulated from each other and arranged in banks corresponding to respective levels, said switch means having other contacts movable in steps along the contacts of the respective banks, electrical operating means for so moving said other contacts, the contacts of each level being electrically connected to the respective contacts of the corresponding bank, independent switch means responsive to the respective functions and electrically connected to certain of said panel contacts for energizing said operating means, said function effecting means being electrically connected to other contacts of said panel insulated from said level contacts, and readily detachable jumpers for selectively interconnecting said level contacts and said other panel contacts to complete circuits to said effecting means for energization thereof.

5. In an automatic programming device for apparatus having means for effecting a plurality of functions; the combination of a control panel having a group of electrical contacts electrically connected to respective function effecting means, a plurality of means for determining respective functions electrically connected, respectively, to another group of electrical contacts of said control panel, sequence switch means having a plurality of contacts insulated from each other and electrically connected, respectively, to still another group of electrical contacts of said control panel, said switch means having other contacts engageable in a sequential manner with the first mentioned switch means contacts to energize the latter, means for sequentially actuating said second mentioned switch means contacts upon energization of said function determining means, and electrical connector means for releasably interconnecting any contact of the first and second mentioned groups with a contact of the third mentioned group.

6. A programming device according to claim 5, wherein a removable unit having openings registered with corresponding contacts of the control is detachably secured thereto, and wherein the electrical connector means are mounted in said openings in releasable electrical connection with related contacts of the control, whereby said unit together with said connector means may be detached from the control without removing the connector means from the openings.

7. A programming device according to claim 5 wherein the control comprises a plurality of electrically connected repeat contacts insulated from the groups of contacts of the control, whereby one of said connector means may be connected to a preselected contact of the second mentioned group and to one of the repeat contacts, and two or more connector means may be connected to other repeat contacts, respectively, and to preselected contacts, respectively, of the third mentioned group.

8. A programming device according to claim 5, wherein a removable unit is detachably mounted on the control, said unit having a group of openings registered with respective contacts of the first mentioned group, said unit having a second group of openings registered with respective contacts of the second mentioned group, and said unit having a third group of openings registered with respective contacts of the third mentioned group, said connector means being characterized by jumpers having their ends removably mounted in the related openings and in releasable electrical connection with related contacts of the control, whereby the unit may be removed from the control and the ends of the jumpers in the openings of the second group may remain therein while the opposite ends of the last mentioned jumpers may be moved an equal number of openings in the third group, to accommodate insertion of steps in a cycle of operation of said device.

9. An automatic programming device according to claim 5, wherein the control is provided with a homing contact insulated from the groups of contacts of the control, and wherein means are provided for operating the actuating means independently of the function determining means, and wherein homing means are electrically connected to said homing contact and are connected to said operating means to operate the latter until said other switch means contacts are in a home position whereat all of the first mentioned switch means contacts are deenergized, and wherein electrical connector means are provided for releasably connecting the homing contact to a preselected control contact of the third mentioned group.

10. In an automatic programming device for apparatus having means for effecting a plurality of functions; the combination of a control system having a plurality of levels insulated from each other and each comprising a plurality of stations insulated from each other, sequence switch means having a plurality of contacts insulated from each other and arranged in banks, the contacts of each bank connected to respective stations of a related level, said switch means having movable contacts sequentially engageable with the contacts of respective banks, a plurality of independent function responsive switches electrically connected to other stations of said control system, means electrically connecting said other stations to preselected stations of at least one of said levels, means electrically connecting said function effecting means to other stations of said levels, a relay electrically connected in series with said function responsive switches, a main line electrically connected to said relay and function responsive switches, another main line electrically connected to said movable contacts, and means responsive to energization of said relay for cutting off flow of electrical current from said other main line and for then moving said movable contacts.

11. A programming device according to claim 10, and including a circuit through said relay bypassing said control system, said movable contacts and said function responsive switches, a home station on said control system, releasable means electrically connecting said home station to a preselected station of one of said levels of said control system, and means responsive to energization of said home station for intermittently opening and closing said bypass circuit to step said movable contacts rapidly to their home position, whereat all of said level connections are deenergized and said last mentioned switch means are rendered ineffective.

References Cited in the file of this patent

UNITED STATES PATENTS 2,427,493    Bullard    Sept. 16, 1947

FOREIGN PATENTS 739,804    Great Britain    Nov. 2, 1955

UNITED STATES PATENT OFFICE
CERTIFICATE OF CORRECTION

Patent No. 2,838,963                              June 17, 1958

Albert E. Good et al.

It is hereby certified that error appears in the printed specification of the above numbered patent requiring correction and that the said Letters Patent should read as corrected below.

Column 15, line 39, for "terimnate" read -- terminate --; line 52, for "level", second occurrence, read -- travel --.

Signed and sealed this 26th day of August 1958.

(SEAL)
Attest:
KARL H. AXLINE
Attesting Officer

ROBERT C. WATSON
Commissioner of Patents